(12) United States Patent
Martz et al.

(10) Patent No.: US 11,065,085 B2
(45) Date of Patent: Jul. 20, 2021

(54) TOOTH-POSITIONING APPLIANCE, SYSTEMS AND METHODS OF PRODUCING AND USING THE SAME

(71) Applicant: Archform Inc., Bakersfield, CA (US)

(72) Inventors: Martin G. Martz, Bakersfield, CA (US); Andrew S. Martz, Bakersfield, CA (US)

(73) Assignee: Archform Inc., Sunnyvale, CA (US)

( * ) Notice: Subject to any disclaimer, the term of this patent is extended or adjusted under 35 U.S.C. 154(b) by 0 days.

(21) Appl. No.: 15/260,026

(22) Filed: Sep. 8, 2016

(65) Prior Publication Data

US 2017/0065373 A1 Mar. 9, 2017

Related U.S. Application Data

(60) Provisional application No. 62/215,377, filed on Sep. 8, 2015.

(51) Int. Cl.
*A61C 7/08* (2006.01)
*A61C 7/00* (2006.01)
*B33Y 80/00* (2015.01)

(52) U.S. Cl.
CPC .............. *A61C 7/08* (2013.01); *A61C 7/002* (2013.01); *B33Y 80/00* (2014.12)

(58) Field of Classification Search
CPC .......... A61C 7/08; A61C 7/10; A61C 7/12–36
USPC ............................................................ 433/6
See application file for complete search history.

(56) References Cited

U.S. PATENT DOCUMENTS

| 3,237,305 | A | 3/1966 | Hegedus |
| 3,593,421 | A | 7/1971 | Brader |
| 3,762,050 | A | 10/1973 | Dal Pont |
| 3,988,832 | A | 11/1976 | Wallshein |
| 4,793,803 | A | 12/1988 | Martz |
| 4,976,614 | A | 12/1990 | Tepper |
| 5,055,039 | A | 10/1991 | Abbatte et al. |
| 5,145,364 | A | 9/1992 | Martz et al. |
| 5,310,340 | A | 5/1994 | Zedda |
| 6,299,440 | B1 | 10/2001 | Phan et al. |
| 6,572,372 | B1 | 6/2003 | Phan et al. |
| 7,234,934 | B2 | 6/2007 | Rosenberg |
| 8,292,617 | B2 | 10/2012 | Brandt et al. |
| 8,517,726 | B2 | 8/2013 | Kakavand et al. |

(Continued)

FOREIGN PATENT DOCUMENTS

| CN | 102078223 A | 6/2011 |
| KR | 20-0465679 Y1 | 3/2013 |

OTHER PUBLICATIONS

PCT International Search Report in PCT/US2016/050787, dated Jan. 6, 2017, 6 pages.

(Continued)

*Primary Examiner* — Edward Moran
(74) *Attorney, Agent, or Firm* — Wallenfelt Law PLC

(57) ABSTRACT

Tooth-positioning appliances and apparatuses, components, methods, and techniques for producing and using tooth-positioning appliances are provided. An example tooth-positioning appliance for adjusting the position of teeth of a patient includes a tooth-clasping arrangement shaped to secure the orthodontic appliance to at least one tooth and a flexible arrangement connected to the tooth-clasping arrangement. The flexible arrangement is less rigid than the tooth-clasping arrangement.

17 Claims, 21 Drawing Sheets

(56) References Cited

U.S. PATENT DOCUMENTS

| | | | |
|---|---|---|---|
| 8,708,697 B2 | 4/2014 | Li et al. | |
| 9,119,691 B2 | 9/2015 | Namiranian et al. | |
| 9,795,460 B2 | 10/2017 | Martz et al. | |
| 2001/0041320 A1* | 11/2001 | Phan | B29C 51/002 |
| | | | 433/6 |
| 2002/0106604 A1 | 8/2002 | Phan et al. | |
| 2003/0190576 A1* | 10/2003 | Phan | A61C 7/00 |
| | | | 433/6 |
| 2004/0048222 A1 | 3/2004 | Forster et al. | |
| 2004/0067463 A1 | 4/2004 | Rosenberg | |
| 2004/0170941 A1 | 9/2004 | Phan et al. | |
| 2005/0233276 A1 | 10/2005 | Kopelman et al. | |
| 2006/0068354 A1 | 3/2006 | Jeckel | |
| 2006/0188834 A1 | 8/2006 | Hilliard | |
| 2007/0231765 A1 | 10/2007 | Phan et al. | |
| 2009/0098500 A1 | 4/2009 | Diaz Rendon | |
| 2010/0068671 A1 | 3/2010 | Kakavand et al. | |
| 2010/0086890 A1* | 4/2010 | Kuo | A61C 7/08 |
| | | | 433/6 |
| 2010/0279245 A1 | 11/2010 | Navarro | |
| 2011/0020761 A1 | 1/2011 | Kalili | |
| 2011/0136072 A1 | 6/2011 | Li et al. | |
| 2011/0311937 A1 | 12/2011 | McCance | |
| 2012/0129117 A1 | 5/2012 | McCance | |
| 2012/0150494 A1 | 6/2012 | Anderson et al. | |
| 2013/0230819 A1 | 9/2013 | Arruda | |
| 2014/0363779 A1 | 12/2014 | Kopelman | |
| 2015/0157421 A1 | 6/2015 | Martz et al. | |
| 2015/0216627 A1* | 8/2015 | Kopelman | A61C 7/08 |
| | | | 433/6 |
| 2015/0265376 A1* | 9/2015 | Kopelman | A61C 7/08 |
| | | | 433/6 |
| 2015/0305832 A1 | 10/2015 | Patel | |
| 2015/0366637 A1* | 12/2015 | Kopelman | A61C 7/08 |
| | | | 433/6 |
| 2015/0366638 A1* | 12/2015 | Kopelman | A61C 7/08 |
| | | | 433/6 |

OTHER PUBLICATIONS

Extended European Search Report for European Application No. 16845053.4, dated May 9, 2019, 9 pages.

"Mesostructured Cellular Materials: Early Prototypes" Wayback Machine Generated NPL, post by fulltilt to MakerBot Thingiverse, Aug. 3, 2014, www.thingiverse.com/make:88085 (Year: 2014), 2 pages.

Australian Examination report No. 1 for standard patent application (App. No. 2016321226), dated Sep. 21, 2020, 5 pages.

European Communication pursuant to article 94(3) EPC, dated Jun. 30, 2020, 6 pages.

PCT International Search Report in PCT/US2020/033611, dated Sep. 16. 2020, 5 pages.

* cited by examiner

1400

1500

1700

TOOTH-POSITIONING APPLIANCE, SYSTEMS AND METHODS OF PRODUCING AND USING THE SAME

CROSS REFERENCE TO RELATED APPLICATION

This application claims priority to U.S. Ser. No. 62/215,377, titled TOOTH-POSITIONING APPLIANCE, filed on Sep. 8, 2015, the disclosure of which is hereby incorporated by reference in its entirety.

FIELD OF THE DISCLOSURE

The present disclosure relates generally to the field of orthodontics. More specifically, a tooth-positioning appliance with a tooth-clasping assembly for engaging one or more teeth and a flexible assembly for flexibly joining portions of the tooth-clasping assembly.

BACKGROUND

A wide variety of orthodontic aligners have been used for many years in repositioning teeth during orthodontic treatment. It should be noted that the terms "aligner," "positioner," "tooth-positioning appliance" and "orthodontic appliance" are largely synonymous as used in the orthodontic field.

This type of orthodontic treatment typically uses separate tooth-positioning appliances for the upper and lower teeth. The tooth-positioning appliances fit over the teeth, covering at least some of the facial and lingual surfaces of some or all of the teeth, and often at least some of the occlusal, or biting surfaces of the teeth. The early positioners described in the prior art were made from a set of plaster models derived from three-dimensional negative dental impressions of the patient's teeth. The plaster dental models were modified by cutting the teeth apart using a small jeweler's saw or rotary cutting discs, followed by repositioning the plaster teeth in a better, straighter, desired arrangement, and then holding the teeth in the new arrangement with dental wax. The reset teeth molds provide the basis for manufacturing the positioners. The resilience of the material from which the positioner is made provides the energy to move the teeth from their original position toward the new straightened position. From the earliest disclosure of the tooth positioner, many of the proposed designs in the prior art have shown moving the teeth in a series of incremental steps. Making a series of appliances is difficult if the tooth arrangement for each step must be made by hand using plaster and wax.

Starting in the early 1990s, digital technologies have begun to provide orthodontists with fundamentally new tools for delivering orthodontic treatment by fabricating tooth models in small but accurate incremental steps. Commercially-available CAD/CAM software can produce the desired tooth models, from which a progressive series of appliances can be manufactured. These tools include 3D imaging of the patient's dentition, and CAD/CAM (computer-aided design and manufacturing) systems for creating virtual models in orthodontic treatment to then produce customized orthodontic appliances.

An example of the successful orthodontic application of these digital technologies is seen in the commercial service known as the Invisalign® program by Align Technology, Inc. of San Jose, Calif. The Invisalign program is largely based on U.S. Pat. No. 5,975,893 (Chishti et al.) and many related patents, including U.S. Pat. No. 6,398,548 (Muhammad et al.). Invisalign tooth positioners are a progressive series of thin, transparent plastic appliances formed over computer-generated forming patterns grown from a virtual model of the patient's dental anatomy. The process for forming aligners uses a combination of vacuum, pressure and heat. This forming process is informally referred to within the orthodontic laboratory community as the "suck down" process.

In one process for producing a series of Invisalign-type tooth aligners, a technician first scans a patient's upper and lower model set to obtain CAD-manipulatable virtual models of a patient's dental anatomy. A model set normally consists of one upper and one lower plaster model of the teeth, palate, and gums. Once the virtual model of the original malocclusion has been obtained, a technician will then undertake steps involving extensive manipulation of the virtual malocclusion. This involves extensive repositioning of the teeth according to a comprehensive and sequential procedure, ultimately arriving at a finished or ideal occlusion for that patient. The finished occlusion in the virtual model is consistent with the complete repositioning of the patient's upper and lower occlusion that would result at the end of successful conventional orthodontic treatment. After the steps described above are accomplished, the technician possesses two versions of the patient's teeth available within the virtual CAD environment. One version represents the original malocclusion and the other represents the ideal occlusion. In other words, the technician has the beginning and the end states.

The next step in the process involves the creation of an incremental, progressive series of physical forming models. Each of these forming models represents a snapshot of the patient's future occlusion at specific incremental steps along the patient's proposed treatment sequence between the beginning and the end conditions as described above. To accomplish this, the technician creates a virtual "first transition model" that sees a slight repositioning of all or most of the teeth. This first transition model sees some or all of the teeth being subtly moved from their original pre-treatment positions to a virtual first transition position that is in the direction of their intended finished positions. Similarly, a second virtual transition model is created that sees the virtual teeth being moved again slightly further in the desired directions. The objective of the Invisalign technician is to create a series of progressive models, with each biased slightly further than the previous one, and each moving the teeth slightly closer to their finished target positions. A final forming model will take the teeth from the series of transition positions and move them into their final, desired positions.

Once such a series of virtual intermediate forming models has been created and a final forming model has been created by the technician, digital code representing each of the models in the series is directed to operate a rapid prototyping machine. Within a rapid prototyping machine, the series of physical forming models are produced using any of a number of conventional processes, such as computer numerically-controlled (CNC) machining, stereo lithography or 3D printing. The production step results in the production of hard, physical duplicates of each of the series of virtual intermediate models and the final model.

The next step of the process sees each of the series of physical models being in turn mounted in a vacuum machine (also referred to as a suck-down machine) where a combination of pressure, heat, and vacuum is used to form the actual series of progressive aligners from plastic sheet material of a constant thickness. Once the series of progressive aligners are formed and trimmed, they are sequentially labeled, packaged, and shipped to the attending orthodontist. The orthodontist then schedules an appointment for the patient, at which time the aligners and instructions for their use are given to the patient. The patient is instructed to wear the first set of aligners for a period of time, typically two weeks. After that, the first set is discarded and the patient transitions to the next set of the series and so on.

The aligners serve to urge the patient's teeth to move according to the positional biases created virtually by the technician. The teeth are progressively biased and urged to move in desired directions toward their predetermined finished positions by the resilience of the polymeric material of the aligner. Ideally, gentle but continuous forces would be delivered by the aligners, causing certain physiological processes involving the creation and resorbtion of the bone supporting the roots of the teeth to take place. The net result should be the slow, progressive orthodontic movement of the roots of the teeth through the underlying bone toward desirable positions and orientations.

Many conventional removable aligners are limited by their design and the mechanical properties of the clear thermoplastic materials that are currently utilized. Clear polymeric materials make the aligner nearly invisible, and that is a great advantage over fixed stainless steel hardware and metal braces. On the other hand, conventional polymeric materials used in forming aligners have a very limited ability to flex in all directions. This is particularly problematic when aligning teeth that are not fairly well lined up in the beginning of treatment. Recent published studies have shown that each stage of conventional aligners deliver fairly high forces when they are first delivered, and then the applied forces diminish rapidly. This results in intermittent force delivery rather than the desired light continuous, gentle forces.

Even when very small movements during each stage are attempted, the appliance may fail to properly engage teeth that need to be moved because the appliance is not adequately flexible and is not designed to allow movement within the plane of the material. If a particular aligner fails to properly engage a tooth, then that tooth will not move to the proper place to engage the next successive aligner in the series. The only present solutions available when aligners fail to properly engage a tooth are: (1) reduce the amount of movement attempted for that particular stage; or (2) place a larger bonded attachment on the tooth. Both of these solutions typically require reworking the computerized treatment plan. If the plan is not revised, with each successive stage of the appliance, the fit of the aligners deteriorates, and after just a few stages, it becomes obvious that the teeth are not moving according to the original computerized treatment plan, forcing a revision of the treatment plan. The ability of the appliance to precisely engage individual teeth, whether they are to be moved, or if they are to be used as anchor teeth to assist in the movement of other teeth is critical to the success of orthodontic treatment.

SUMMARY

This disclosure provides an orthodontic appliance having a thin elastomeric shell with a series of recesses for removably receiving a number of the patient's teeth, and tooth-clasping elements for removably engaging selected teeth. The appliance also incorporates a number of flexible zones created by flexible patterns in the shell to allow enhanced flexibility in selected zones of the appliance. For example, the flexible zones can be created by 3D printing a pattern of voids, folds, or areas of reduced thickness in the shell of the appliance.

These and other advantages, features, and objects of the present disclosure will be more readily understood in view of the following detailed description and the drawings.

BRIEF DESCRIPTION OF THE DRAWINGS

The present disclosure can be more readily understood in conjunction with the accompanying drawings, in which.

DETAILED DESCRIPTION

Figure 1:
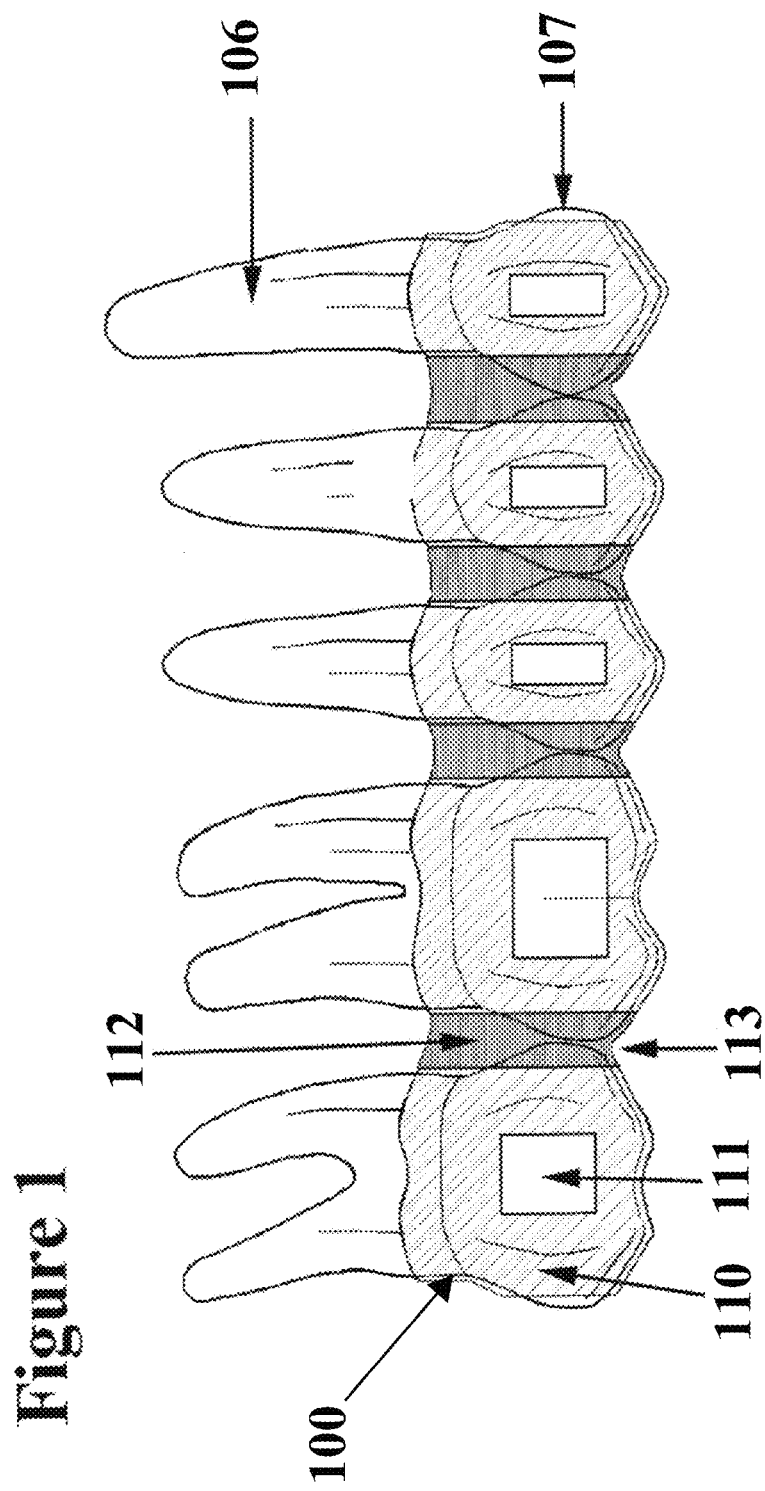
FIG. 1 is a schematic diagram of a right side view of a portion of an orthodontic appliance covering the upper right posterior teeth with tooth-clasping elements covering almost all of the tooth surfaces. Each tooth-clasping element surrounds and can optionally cover a bonded attachment here shown protruding through a hole in the shell of the appliance. Between each pair of adjacent tooth-clasping elements is a flexible zone covering the interproximal area of the teeth.

The present disclosure addresses the problem of the lack of flexibility within the shell of the appliance by replacing portions of the shell with a flexible pattern to create zones of enhanced flexibility. For example, these appliances can be produced with flexible zones. The patterns can be produced by a rapid prototyping machine, such as a digital 3D printer, or using thermoforming technology. Alternatively, the flexible patterns could be created in a shell of plastic material by using a numerically-controlled milling machine, or the shape of the appliance and the patterns can be constructed by hand using manual cutting tools or by using rotary-cutting instruments.

A wide variety of flexible patterns are available. The location of the flexible zones can be anywhere on the appliance, but should provide flexure and force application for intended and effective tooth movement. The flexibility of the zones depends on many factors including: the geometry of the pattern chosen, the physical properties of material, and the size and orientation of the patterned area. The flexible zone of the appliance can be designed to provide various types of flexure, including elongation and compression, flexure in and out of the plane of the appliance, and twisting or bending movements. The present disclosure can be employed to accomplish all types of tooth movements that can be accomplished using other types of orthodontic appliances including both fixed and removable appliances. These movements include vertical movements, tipping movements, horizontal bodily movements without tipping, rotational movements, space closure, space opening, intrusion and extrusion of individual teeth or groups of teeth.

FIGS. 1-6 show a right side view of a portion of embodiments of an orthodontic appliance covering the upper right posterior teeth 107. The supporting bone and gum tissue are not shown—only the teeth 107 with the appliances in place. In each of the figures, the roots 106 of the teeth are shown. Although the appliances in these figures appear to end at the mesial surface of the cuspid tooth, in most embodiments the appliance continues around the arch to removably attach to the incisor teeth and the posterior teeth on the opposite side of the arch. The configuration on the lingual side does not necessarily have to match the configuration shown on the facial side of the appliance.

The present orthodontic appliance includes a thin elastomeric shell with a series of recesses for removably receiving a number of teeth 107. The appliance also incorporates a number of tooth-clasping elements 110 for removably engaging the appliance to the teeth 107. For example, the tooth-clasping element 110 can be a functional region of a single-piece appliance, although some of the embodiments do not have a separately manufactured part designated for this function. The tooth-clasping element 110 can include recesses or holes designed to fit over projecting elements such as the bonded attachments 111 (also referred to as buttons) that can be bonded directly to the teeth. The bonded attachments 111 are typically not removable by the patient during the course of active orthodontic treatment.

FIG. 1 shows an appliance with tooth-clasping elements 110 covering almost all of the tooth surfaces. Each tooth-clasping element 110 surrounds a tooth of the teeth 107 and can optionally cover a bonded attachment 111 attached to the tooth of the teeth 107. Here, the bonded attachments 111 are shown protruding through corresponding holes in the tooth-clasping elements 110. Between each pair of adjacent tooth-clasping elements 110 is a flexible zone 112. For example, the flexible zones 112 can be made by varying the topography in two or three dimension to add thickness, for example voids, fold lines, variations in height or thickness, and other features may be added to predetermined zones of the shell of the appliance to add flexibility. Although alternatives are possible, the topographic features (e.g., voids) are arranged in patterns in some embodiments. As an alternative, the topographic features may be disposed at locations on the shell that are identified using by a computer performing a generative design process.

In the embodiment illustrated in FIG. 1, the flexible zones 112 are narrow horizontally with the greatest dimension oriented vertically. The flexible zones 112 primarily cover the interproximal areas of the teeth 107 on the buccal and lingual sides of the teeth 107. A band of the flexible zone 112 goes across the occlusal surfaces of the teeth 107 at the marginal ridge areas and the interproximal occlusal area 113. In certain embodiments, such as when adjacent teeth are significantly misaligned, it may be desirable to have the printed pattern only on the buccal and lingual surfaces and not over the occlusal surface, as the presence of the flexible zone 112 is likely to make the appliance less flexible than simply having an opening in the appliance in this area.

Alternatively, the present orthodontic appliance can be described as requiring at least two functional zones. The first functional zone serves as the tooth-clasping element 110. This first zone can be made of any material, but preferably would be made of a clear material so as to minimize the visibility of the appliance. This zone accomplishes the purpose of grasping the tooth, including grasping any bonded attachments 111 that are optionally bonded directly to the tooth surface. Preferably, bonded attachments 111 with straight sides would be bonded on both the buccal and lingual surfaces of each tooth 107 in the dental arch that is covered by the appliance, however any shape for the bonded attachment 111 can be used. It is not absolutely necessary to use bonded attachments at all, or they can be used only on either the buccal or lingual side. The bonded attachments 111 help to ensure that control over tooth positions in three dimensions can occur. The functional zone serving as the tooth-clasping element 110 may cover only one individual tooth, or it may cover multiple teeth depending on the malocclusion present and the needs and desires of the orthodontist to accomplish certain types of tooth movements and the need for anchorage control.

The second functional element is a flexible zone 112 of the appliance serving to enhance flexibility of the appliance shell. The flexible zone 112 can be made of the same material that comprises the tooth-clasping element 110, or it can be made of another material. It is likely that the appliance will have more than one flexible zone 112. It is possible to make an appliance that is not divided into zones, but rather most of the appliance is made of the flexible pattern.

Returning to FIG. 1, the tooth-clasping elements 110 preferably include: (a) a circumferential area immediately surrounding the bonded attachment 111 and/or covering the bonded attachment 111; (b) a zone including the areas of the teeth with the greatest undercut (typically along the gum line or the edge of the interproximal areas) for retention purposes; and (c) a connecting zone with a band of fairly rigid material going over a portion of the occlusal surface of the tooth or teeth and extending vertically to include either the circumferential areas surrounding a bonded attachment 111 on the buccal and/or lingual surfaces of the teeth or the areas with greatest undercut. This band of material extending from the buccal side of the tooth to the lingual side of the tooth acts as a U-shaped clamp or clasp, to engage the tooth. The tooth-clasping elements 110 can cover almost the entire crown of each individual tooth and include either a formed recess to surround and engage a bonded attachment 111 or a hole through which the bonded attachment 111 protrudes. Alternatively, the tooth-clasping function can be performed primarily by the patterned elastomeric shell of the appliance, with or without the use of a bonded attachment 111. If a bonded attachment 111 is used, the tooth-clasping function can be performed by having a simple border around the bonded attachment 111. The areas covered by the flexible zones 112 can be small if only limited flexibility is desired, or larger if greater flexibility is required. The bonded attachments 111 that are shown have a rectangular shape, although several other suitable geometric shapes can also be utilized.

The tooth-clasping elements 110 on the anterior teeth can be made of any suitable material, and is typically made from a clear material. The tooth-clasping elements can be formed from several different types of plastic materials including but not limited to rapid prototyping materials and vacuum forming. Example material types include but are not limited to urethanes, acrylics, and polycarbonates, which can be thermoformed over tooth models to produce the desired tooth alignment appliances. The material can be an acrylate-functional material or any other suitable material. In some embodiments, the bonded attachments 111 have a rectangular shape with parallel side surfaces and parallel top and bottom surfaces. It is to be understood that there are many possible shapes for bonded attachments that would be suitable. Many different styles and shapes have been shown in the prior art, which one of skill in the art would recognize can be used with the appliances described herein. Bonded attachments are utilized in this disclosure for at least two purposes. First, the bonded attachments increase retention of the tooth-clasping elements to the teeth, so that the appliance is less likely to become dislodged from the desired location on the teeth. When the appliance is fitted into place on the teeth, it follows an approximately vertical path described by dentists as the path of insertion, which is approximately perpendicular to the biting surfaces of the teeth called the "plane of occlusion." The curved shape of teeth provides some natural undercuts in some areas when one views the teeth from the path of insertion. However, not all teeth have undercuts when viewed from the perspective of the path of insertion. It depends on the tooth. For instance, most anterior teeth (incisors and cuspids) have only small undercuts and these are near the gum line. A tooth that is incompletely erupted, or a tooth of a young person with gum tissue partially covering the teeth may not have any undercuts when viewed from the perspective of the path of insertion. It also depends on the angulation of the tooth. If the long axis is tipped from the ideal position, there may be no undercuts on one side of the tooth relative to the path of insertion. The retention of the tooth-clasping element is enhanced by the presence of bonded attachments placed on the teeth. The bonded attachment is shaped in such a way as to provide an undercut surface when viewed from the perspective of the long axis of the tooth and from the path of insertion. The top and bottom surfaces are the primary surfaces to enhance undercuts.

The second purpose for bonded attachments 111 is to have a shape that allows the tooth-clasping element 110 to transmit desired forces to the teeth 107 in three dimensions, thereby providing control over movement of root 106. The actual forces to move the teeth are provided by the resilient properties of the flexible interconnecting elements or by regions of the appliance that are deformed when tooth-clasping elements are engaged on the teeth with the bonded attachments. The tooth-clasping elements 110 precisely grip the teeth 107, with the enabling mating shape of the bonded attachments 111. The bonded attachments 111 shown in the figures have a flat rectangular shape and provide a connection with the tooth-clasping element 110 in two dimensions. The combination of the two bonded attachments 111 on either side of the teeth 107 (with each of the bonded attachments 111 acting at the ends of a lever arm) allows forces to be applied for control of movement of root 106 in the third dimension.

In the rectangular bonded attachments 111 shown, the parallel outer edges of the bonded attachment 111 provide a surface for positive engagement to allow forces to be applied to the teeth 107 to control movement of root 106. Grooves or special shaping on the outer surface of the bonded attachment 111 can help guide the tooth clasp into position. The bonded attachments can be pre-made of any suitable material including dental composite, clear or tooth-colored ceramic materials, or any suitable clear plastic material, and bonded to the teeth using conventional bonding techniques and adhesives that are well-known in the art including the steps of mildly acid-etching the enamel prior to placing the bonded attachment. A technique well-known in the art called indirect bonding can be utilized, with a pre-formed guide made of flexible material to hold the attachments in the desired position while the adhesive is curing to ensure accurate attachment placement on the teeth. The bonded attachments 111 can alternatively be fabricated out of dental composite using pre-made hand-held molds for placement on teeth one at a time. Such pre-made hand-held molds are commercially available for this purpose. A third alternative is to utilize a mold made using computer 3D CAD/CAM technology where the shape and the size of the attachments are planned in the computer and a model of the entire dental arch with attachments in place is printed using a 3D printer. From this model a mold is made from which to fabricate and place dental composite attachments in precisely the right location directly on the teeth. The software to accomplish this task is commercially available. The tooth-clasping elements 110 shown in the figures include a rectangular hole of precise dimensions through which the bonded attachment 111 projects. A recess on the inside of the tooth-clasping element 110 of exactly the same shape and size as the attachment should work equally as well as a hole, particularly if the tooth clasp is printed because of the ability of the printing process to potentially include a better more precise fit than can be obtained by thermoforming. The tooth-clasping elements 110 are attached to flexible interconnecting elements of many types, as illustrated in the drawings. In some of the embodiments, the appliances are made of one piece of material, and the tooth-clasping element and the flexible interconnecting elements are all part of a monolithic whole unit. Functionally, different regions of the single piece positioned serve as the tooth-clasping element and the flexible interconnecting elements.

It is anticipated that the present orthodontic appliances will be primarily produced by planning and designing the appliances using computerized 3D CAD/CAM software. Many off-the-shelf software programs are currently available that are capable of this function. The standard surface mapping computer algorithms define the surface as a series of triangles. The actual physical production of the appliances can be accomplished by vacuum-forming thermoplastic materials over models produced digitally and combining the thermoformed portion of the appliance with the other necessary elements. This step is followed by using computer automated trimming technologies such as CNC milling or laser cutting (e.g., to create voids in the flexible region). In particular, the clear tooth-clasping elements could be produced by vacuum thermoforming. In the single-piece variations, the tooth-clasping elements and the flexible intermediate connectors could all be vacuum thermoformed together.

Alternatively, the present appliance can be directly produced by 3D printing without first producing 3Dimensional models. An advantage of direct 3D printing is that more complex shapes could be more easily printed, and almost no trimming of excess material would be necessary, thereby saving time and avoiding wasted material. Some new 3D printers can print more than one material at the same time. The flexible interconnecting elements could be printed along with the tooth-clasping portion. Although alternatives are possible, in some embodiments, the tooth-clasping portion and the flexible portion are formed from different materials. The materials can be blended or intertwined which will avoid the need for a separate attachment step in manufacturing.

Alternatively, the tooth-clasping portion and the flexible portion are formed from the same material. For example, the flexible portion can be thinner than the tooth-clasping portion. As another example, the material in the flexible portion can be formed with a pattern of voids that causes the material in the flexible portion to be more flexible than the material in the tooth-clasping portion. As yet another example, the flexible portion may include patterns of creases or folds that cause the flexible portion to be more flexible than the tooth clasping portion. Non-limiting example of flexible portions with various patterns are illustrated and described with respect to at least FIGS. 7-20.

Another option involves direct CNC milling of the appliances or portions of the appliances from a block of plastic material. Yet other fabrication techniques can be used to form the appliances too.

For all the variations, a series of appliances can be formed to cause the tooth movement in movement stages. Each appliance is designed to be worn during a movement stage in which the teeth are moved a small distance. After a movement stage is complete, the patient can wear a successive appliance to start a successive movement stage that continues the movement with another small step toward the desired goal tooth position.

In some embodiments, each appliance in the series is designed so as to fit over the desired position of the teeth after movement caused by the appliance. The appliances are deformed to fit over the initial position of the teeth. In some embodiments, the various flexible portions described herein allow the appliance to deform to fit over the initial position of the teeth.

Ideally, the tooth-clasping elements fully engage each tooth when placed on the patient's teeth. If the patient wears the appliance for a sufficient number of hours each day, after the appliance has been worn for a few weeks, the resiliency of the appliance will carry the teeth toward the desired position for the end of that particular movement stage. Then the appliance for the next movement stage is placed on the teeth and will carry the teeth another prescribed distance, and so on until the desired final position is reached. In some embodiments, new impressions or new digital scans during the tooth positioning process (e.g., after every movement stages), which are then used to fabricate successive appliances, to ensure the appliances continue to fit accurately as the process of straightening the teeth progresses. Alternatively, the entire series of appliances can be fabricated initially based on pre-treatment impression or scan data.

As shown in FIG. 1, the tooth-clasping elements can be fitted over individual teeth. However, if adjacent teeth are aligned, and it is anticipated that this will routinely occur during later stages of treatment, it is not necessary to generate a separate tooth-clasping element for each individual tooth in each stage. Groups of adjacent teeth will have tooth-clasping portions combined if these teeth are well aligned with each other. It may also be desirable in certain stages of treatment to combine teeth together in groups to be used as anchorage units, to provide better control over the movements of other groups of teeth. This concept is commonly used in orthodontic treatment with fixed braces, especially when extraction spaces are being closed and is well-described in the prior art. It is also possible to combine features of several variations of the embodiments described in this disclosure into one appliance to accomplish certain types of movements more efficiently.

Figure 2:
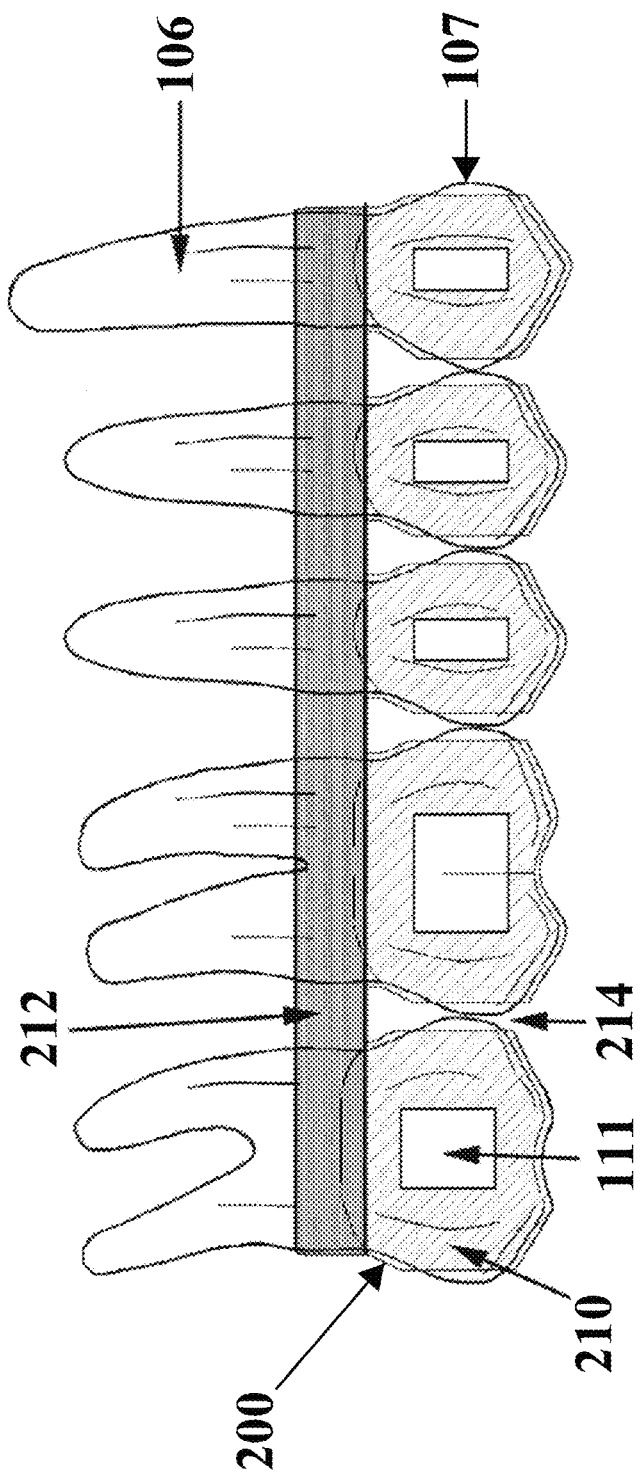
FIG. 2 is a schematic diagram of another embodiment of an orthodontic appliance similar to FIG. 1 with a flexible zone extending as a narrow horizontal band between the tooth-clasping elements.

FIG. 2 shows another embodiment of an orthodontic appliance 200 with tooth-clasping elements 210 covering most of the tooth surfaces. Here again, the tooth-clasping element 210 surrounds and can optionally cover the bonded attachment 111 shown protruding through a hole in the tooth-clasping element 210 having a characteristic shape and dimensions. In this example, the tooth-clasping element 210 includes multiple disjoint parts that are separated by gaps such as gap 214. Attached to each of the disjoint parts of the tooth-clasping element 210 (and in some embodiments made of the same material and continuous with the tooth-clasping element) is a flexible zone 212 made from a printed pattern. The flexible zone 212 is on both the buccal and lingual surfaces of the teeth and is primarily attached to the flange area of the tooth-clasping element 210 covering a portion of the gum tissue immediately adjacent to the gingival margins of the teeth. This flange area is partially obscured by the flexible zone 212 comprising a patterned band. Although not shown in FIG. 2, in some embodiments the tooth-clasping element 210 can include a large flange area that extends further toward or over the gingival tissue. The flexible zone 212 can also cover a small portion of the tooth between the bonded attachment and the gum line. The flexible zone 212 in this embodiment comprises a horizontal band of flexible material that connects each of the disjoint parts of the tooth-clasping element 210.

Figure 3:
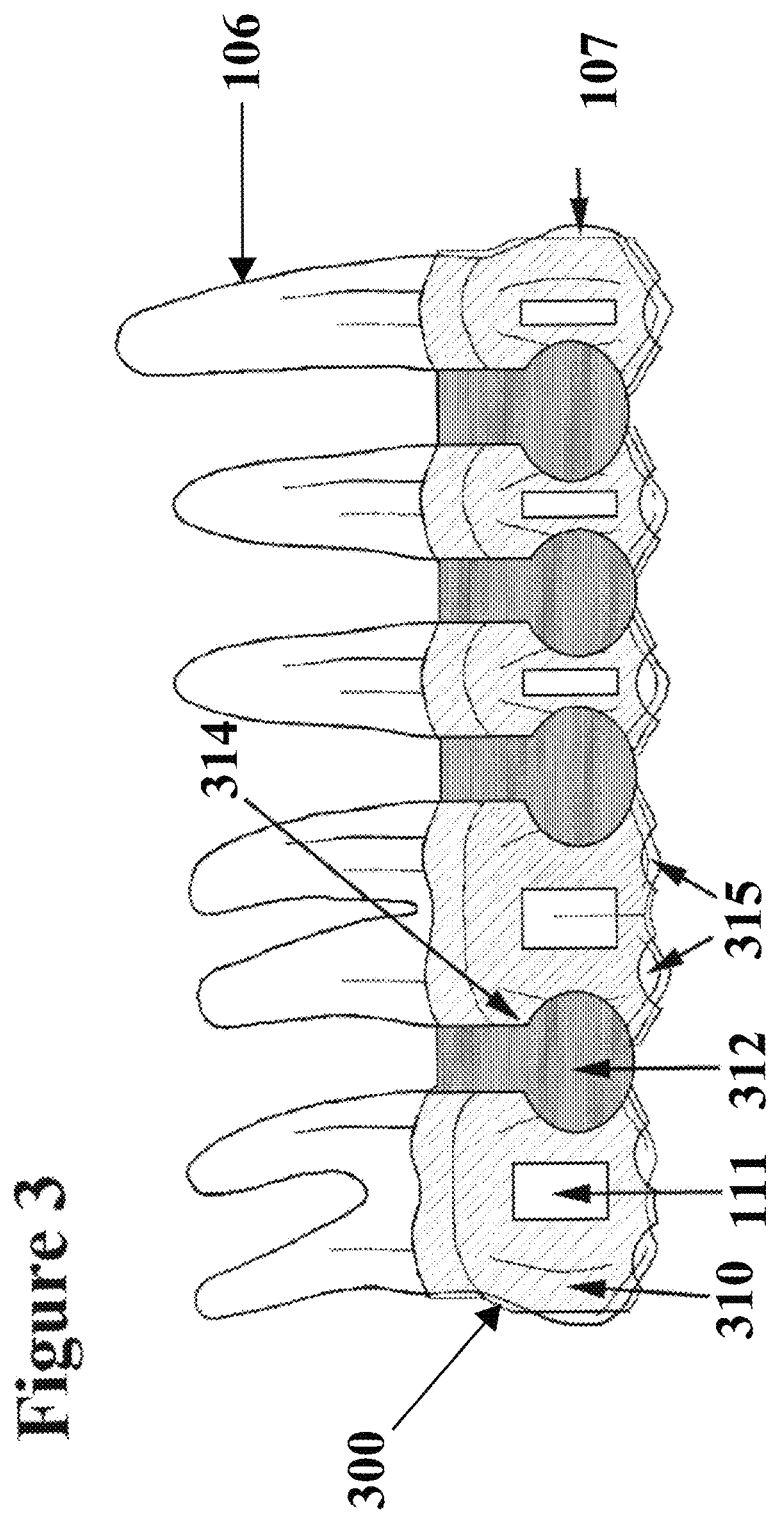
FIG. 3 is a schematic diagram of another embodiment of an appliance similar to FIG. 1 in which there is an irregular border between the tooth-clasping elements and the flexible zone of the appliance, and the flexible zone is larger in size.

FIG. 3 shows another embodiment of an orthodontic appliance 300 similar to FIG. 1 with tooth-clasping elements 310, and bonded attachments 111. The difference is that here there is an irregular border 314 between the tooth-clasping elements 310 and the flexible zone 312 of the appliance. Also, the flexible zone 312 is larger in size. In some embodiments, the larger flexible zone 312 will increase the flexibility and the range of the appliance. The shape of the flexible zone 312 shown in FIG. 3 is an illustration as to how alternative shapes of the flexible zone can be used. The shape of the flexible zone 312 is not confined to the shapes shown here. Other shapes are possible. Optionally, the cusp tips of the teeth can protrude through openings 315 in the tooth-clasping zone of the appliance. Again as in FIG. 1, the flexible zone 312 does not necessarily need to extend over the occlusal surface but can be limited to the buccal and lingual sides of the appliance.

Figure 4:
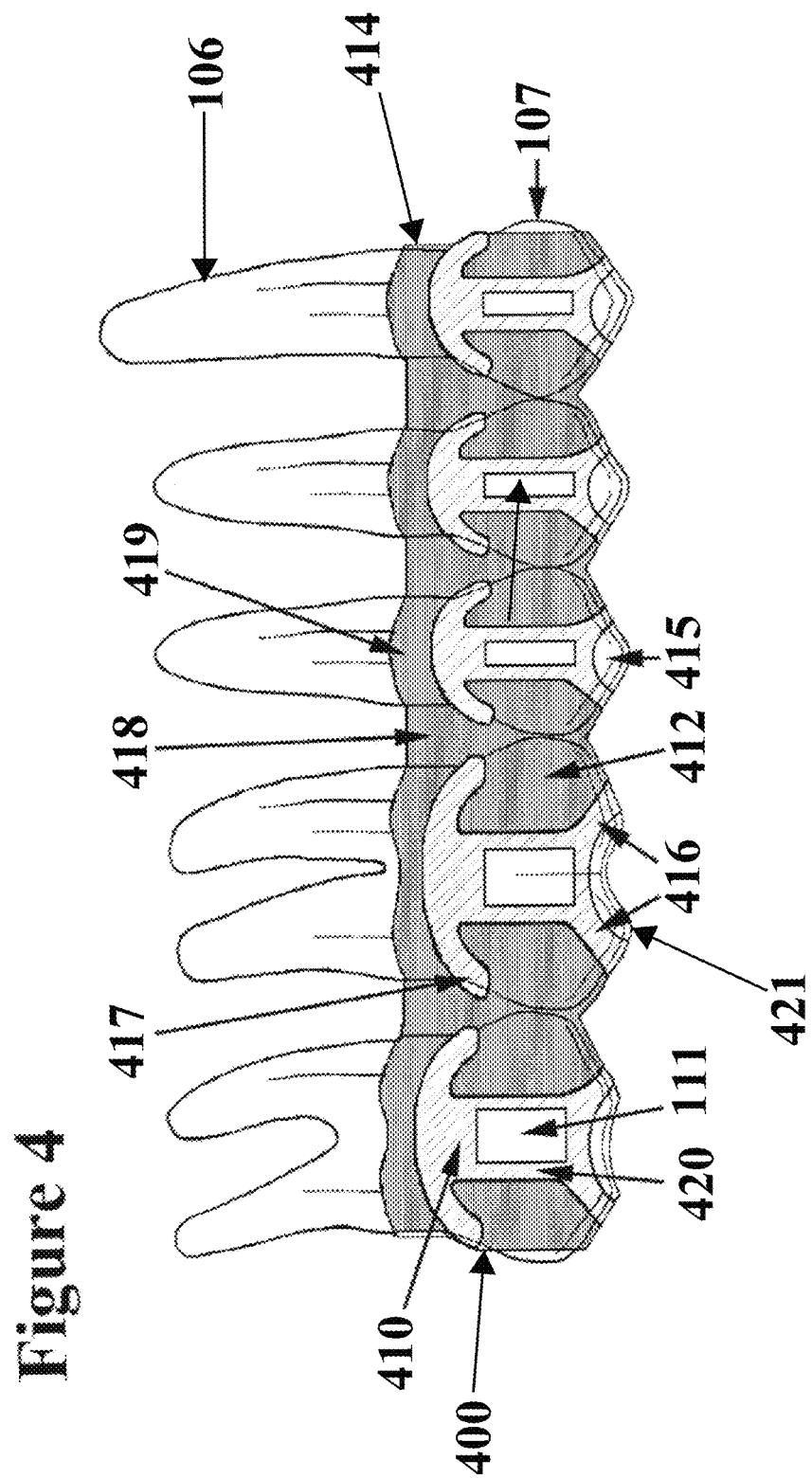
FIG. 4 is a schematic diagram of another embodiment of an appliance in which the size of the tooth-clasping elements is reduced and the flexible zones are enlarged.

FIG. 4 shows an embodiment of an orthodontic appliance 400 with another variation in the shape of the tooth-clasping elements 410. The tooth-clasping elements 410 are reduced in size so that the flexible zone 412 can be larger. Certain key functional portions of the tooth-clasping elements 410 remain. In this illustration, rectangular bonded attachments 111 are shown, although other shapes can be used instead. A portion 420 of the tooth-clasping element 410 immediately surrounding the bonded attachment 111 is in tight contact with the bonded attachment 111. There is also a portion of the tooth-clasping element 410 that engages the undercut areas of the teeth 107 along the gum line and includes an interproximal extension 417 that extends into the interproximal area of the teeth 107. Although alternatives are possible, FIG. 4 shows the interproximal extension 417 extending slightly into the interproximal region. The portion of the clasping elements 410 that crosses over the occlusal surface 421 of the teeth 107 also remains. In this, case the tooth-clasping element 410 has a Y-shaped configuration 416 as it is divided into two bands of material as it crosses over the occlusal surface 421 of the teeth 107.

Optionally, as it is shown in the drawing, the cusp tips can protrude through openings 415 in the tooth-clasping element 410 to reduce contact by the opposing teeth with the orthodontic appliance 410. Aligner appliances are well-known to encroach on the "freeway space" between the upper and lower teeth when the jaw muscles are at rest, and speech is often affected by the presence of the appliances. The openings in the occlusal surface will reduce the vertical height of the appliance over the teeth, making the appliances more comfortable to wear, especially when the user bites down, and less likely to interfere with speech.

The flexible zone 412 includes a flange area 414 formed of flexible patterned material that is shown extending over the gum line adjacent to the crowns of the teeth 107 into the interdental area 418 of the patient's dentition. The flange area 414 is also shown extending over the gum tissue in the interproximal spaces 419 of the teeth 107, or interdental area 418. It is not necessary for the function of this appliance 400 to have the flange area 414 extend over the interdental area 418 and interproximal spaces 419, and it possible for the appliance 400 to be trimmed conventionally along the gum line of the teeth 107. In some embodiments, having the flexible material over the interdental area 418 and interproximal spaces 419 adds to the strength of the appliance 400, and adds some rigidity to the appliance 107 so this is an optional feature that can be utilized or not depending on the desired rigidity of the appliance to treat a specific malocclusion.

Figure 5:
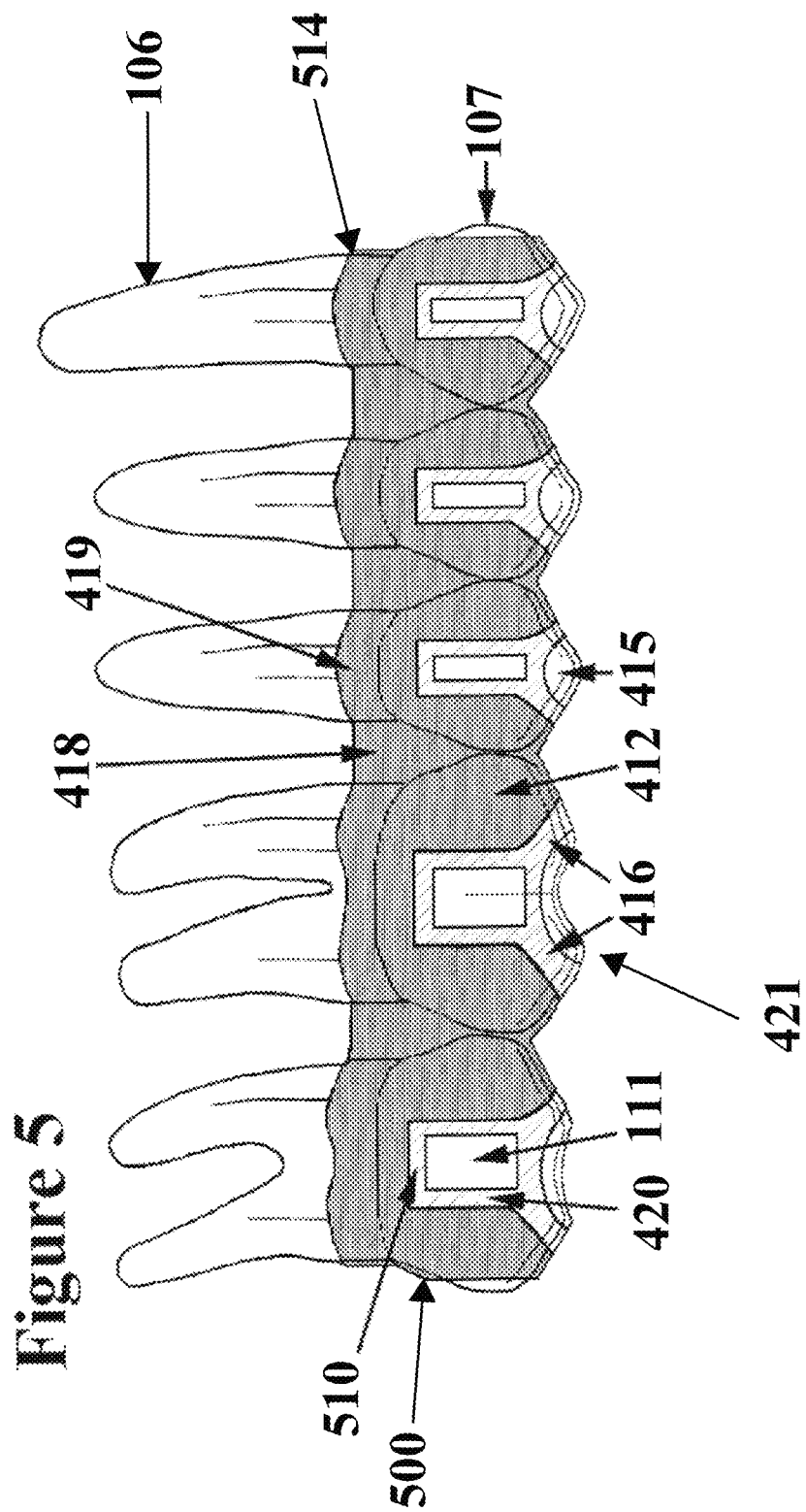
FIG. 5 is a schematic diagram of a simplified variation of an appliance similar to the one shown in FIG. 4.

FIG. 5 shows an embodiment of an orthodontic appliance 500 that is similar to the one shown in FIG. 4, but the design is simplified. The flexible zone 512 covers the lateral surfaces of the crowns of the teeth 107 and includes a flange 514 that extends over the over the gum line to the interdental area 418 and over the interproximal areas 419. The flexible zone 512 is made of a plastic material formed into a flexible pattern. The flange portion 514 that extends over the interdental areas 418 and interproximal areas 419 is optional and is not included in all embodiments.

Rectangular bonded attachments 111 are shown on all of the teeth. The attachments could be made in any shape where there are flat edges to engage the surrounding tooth-clasping element. In this case, the tooth-clasping element 510 includes a border area 420 surrounding the bonded attachment 111. This border area 420 is present on both the buccal side (shown) and the lingual side (not shown), and connecting each of the buccal and lingual areas is another portion crossing over the occlusal surfaces 421 of the teeth 107. In the posterior teeth shown here, the portion of the appliance crossing over the occlusal surfaces is divided into a Y-shaped configuration 416 to allow the cusp tips to protrude through openings 415 in the tooth-clasping portion 510 of the appliance 500 to make it easier to wear the appliance 500. As discussed above with respect to other embodiments, the appliance 500 is shown only on the buccal side of the teeth 107, and the mesial surface of the cuspid tooth of the teeth 107 protrudes through a hole in the appliance. The appliance will usually be made to cover all of the teeth in one arch, and will not normally end at the cuspid as shown here. Ending the appliance at the cuspid is only used here to simplify the drawing.

Figure 6:
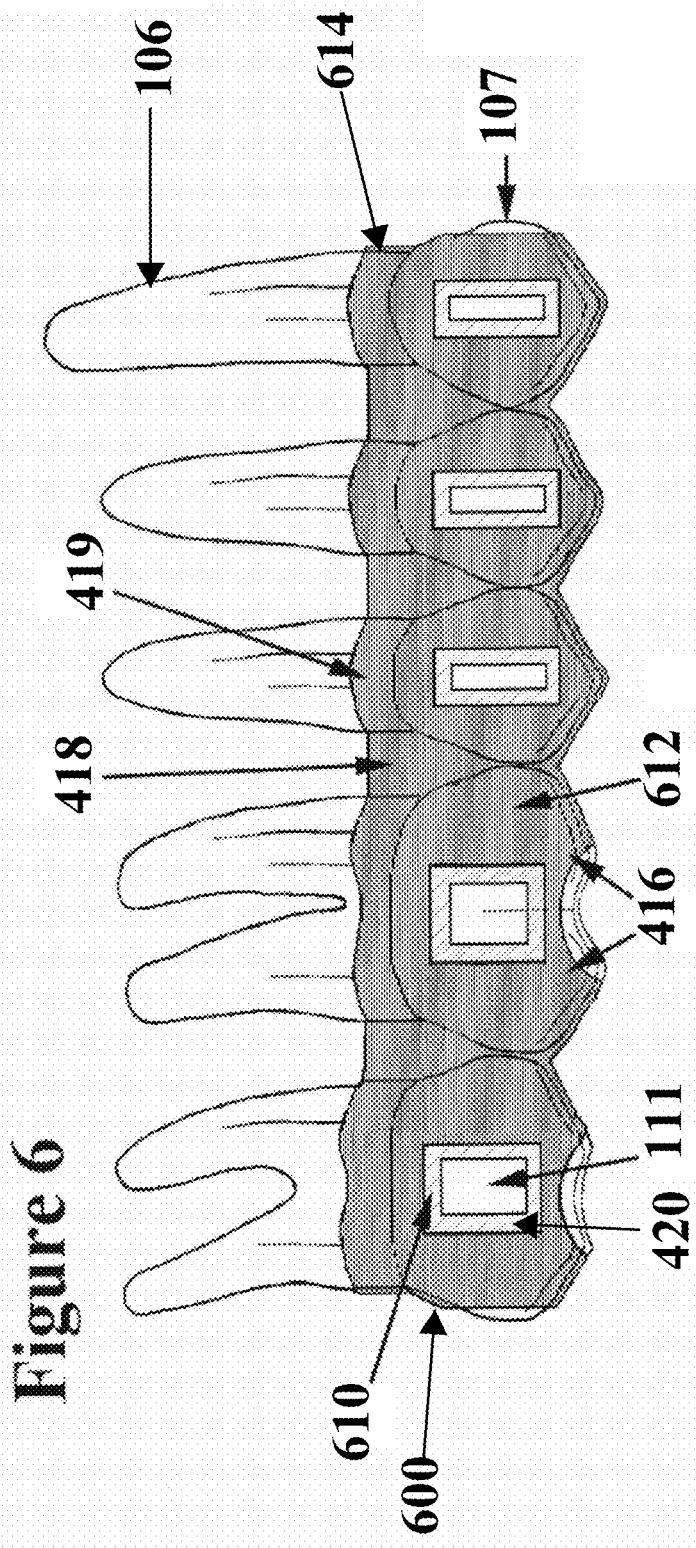
FIG. 6 is a schematic diagram of an embodiment similar to FIG. 5, but the tooth-clasping element surrounds the bonded attachment with narrow borders.

FIG. 6 shows another embodiment of an orthodontic appliance 600 that is similar to the orthodontic appliance 500 shown in FIG. 5, but the tooth-clasping element 610 includes only the border 420 that surrounds the bonded attachment 111. If there are attachments on both the buccal and lingual sides of the teeth, then this border will surround the attachments on both sides. The remainder of the appliance will be formed by the flexible zone 612, which includes a flange 614 that convers the interdental region 418 and the interproximal regions 419 and may be formed from flexible patterned material. The openings 415 in the appliance 600 over the cusp tips of the teeth 107, as shown in FIG. 5, can be used or not used, but are shown here only on the first and second molar teeth, the teeth closest to the anatomic hinge, and therefore the area most likely to experience occlusal contact from the opposing teeth.

Figure 7:
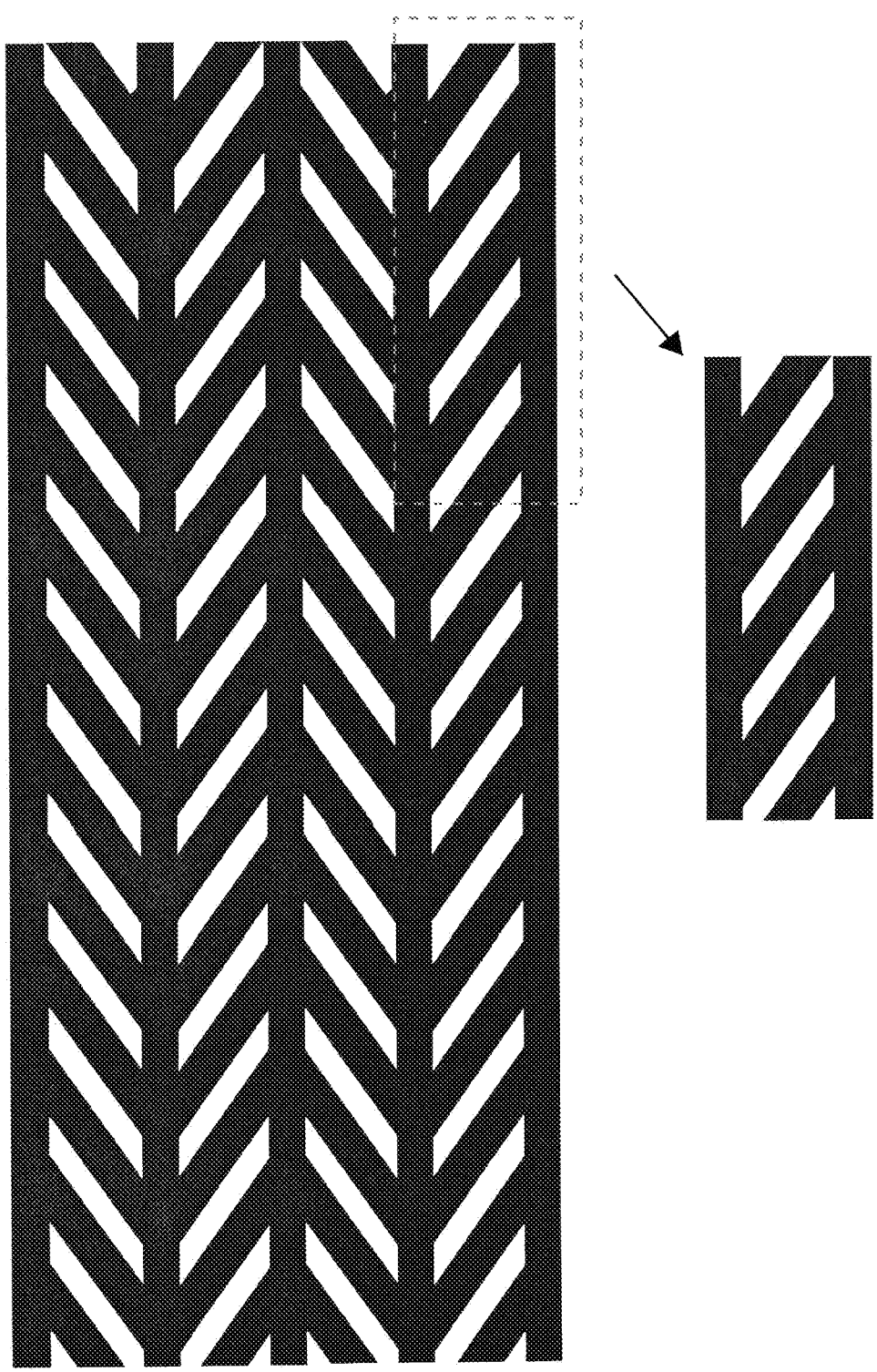
FIG. 7 is a schematic diagram of an example of a flexible pattern to produce a chevron effect.

FIG. 7 is an example of a portion 700 of a flexible zone of an orthodontic appliance, such as but not limited to the orthodontic appliances illustrated in FIGS. 1-6, that includes a flexible 3D pattern. The pattern can be alternated as is shown here to produce a chevron effect, or it can be used with a diagonal stripes going upward toward the left or upward toward the right.

Figures 8A, 8B:
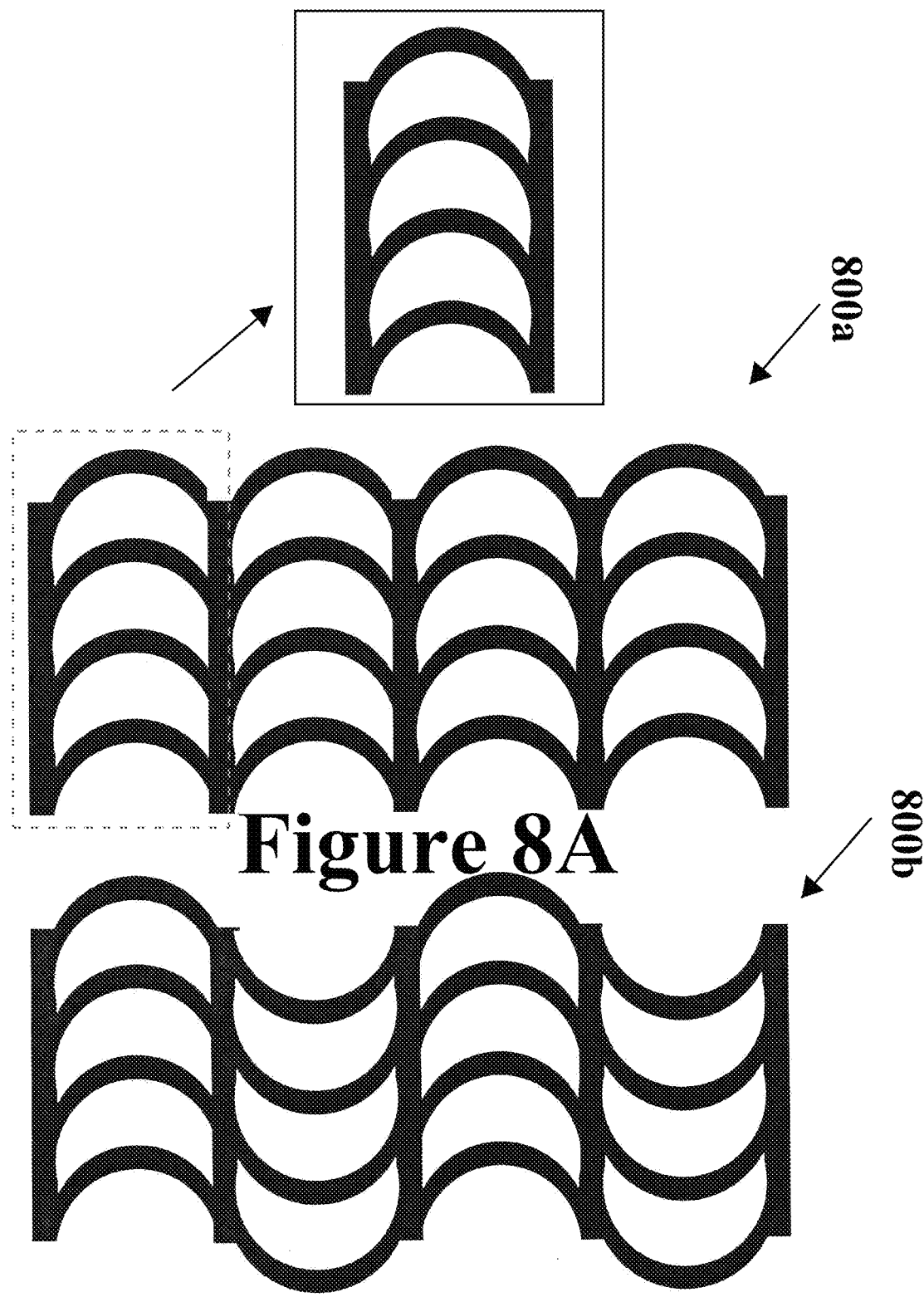
FIG. 8A is a schematic diagram of another example of a flexible pattern with curved segments.
FIG. 8B is a schematic diagram of another example of a flexible pattern with curved segments.

FIGS. 8A and 8B are schematic diagram of examples of portions 800a and 800b of embodiments of flexible zones of orthodontic appliances, such as but not limited to the orthodontic appliances illustrated in FIGS. 1-6, that includes a flexible 3D pattern with curved segments. A pattern can be repetitively combined, with all curves going the same direction as shown in FIG. 8A, or the curves can be alternated to form an "S" pattern as shown in FIG. 8B.

Figure 9:
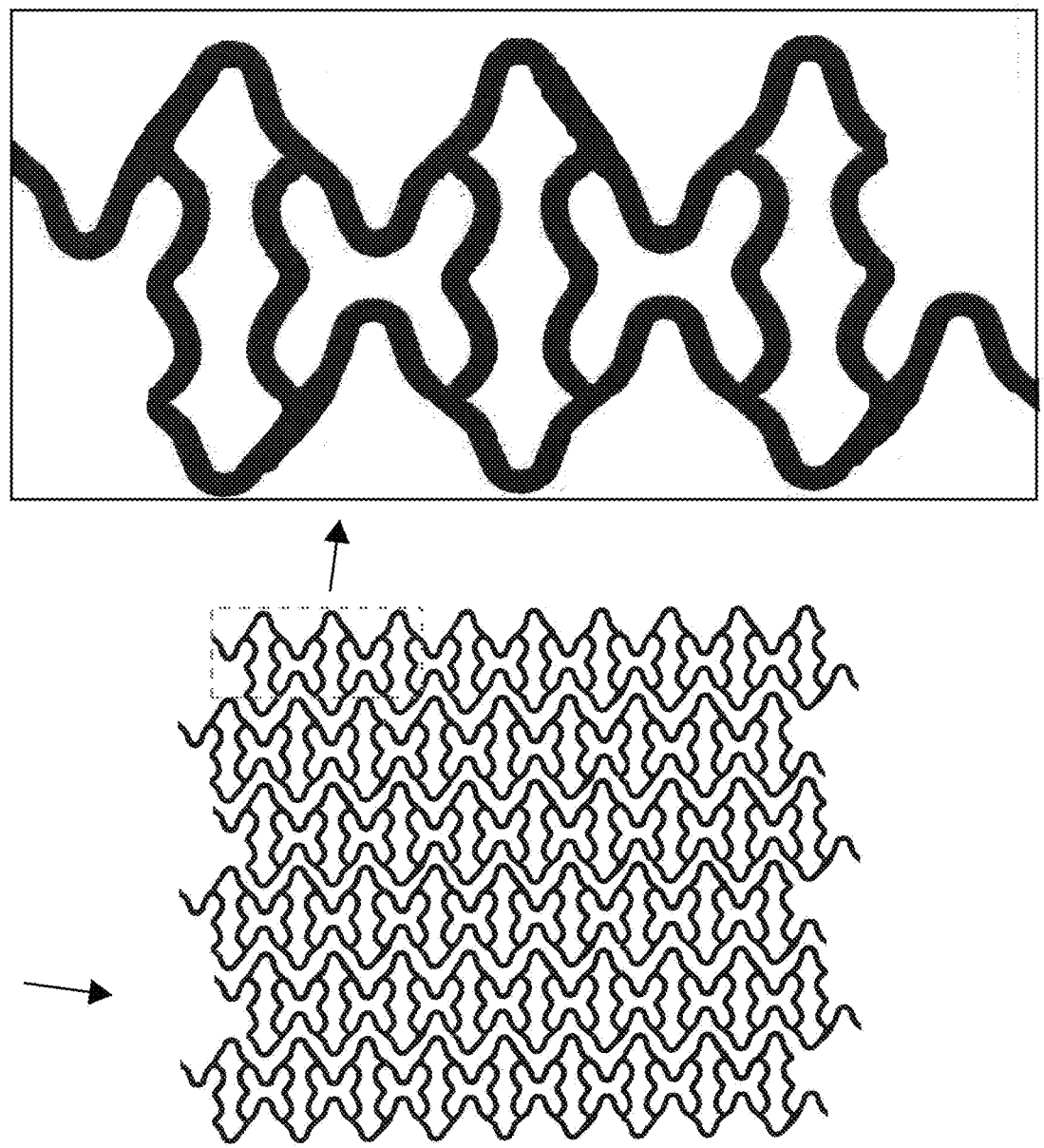
FIG. 9 is a schematic diagram of another example of a flexible pattern. The upper pattern is repeated in the field below.

FIG. 9 is a schematic diagram of another example of a portion 900 of an embodiment of a flexible zone of an orthodontic appliance, such as but not limited to the orthodontic appliances illustrated in FIGS. 1-6, that includes a flexible pattern. In at least some embodiments, the flexible pattern allows movement/flexing in one, two, or three dimension. Although the pattern shown in FIG. 9 is two dimensional, alternative three-dimensional variations of the pattern can be used as well. The upper pattern is repeated in rows in the field below. Although not shown in FIG. 9, the rows are often connected to each other in the flexible regions. For example, the row can be connected to each other with vertical connecting links disposed at intervals along the rows. In various embodiments, various numbers of connecting links can be disposed at various positions. The number and location of the connecting links can be modified when the appliance is being fabricated to affect the final properties of the flexible region, such as strength and flexibility in various directions.

Figure 10:
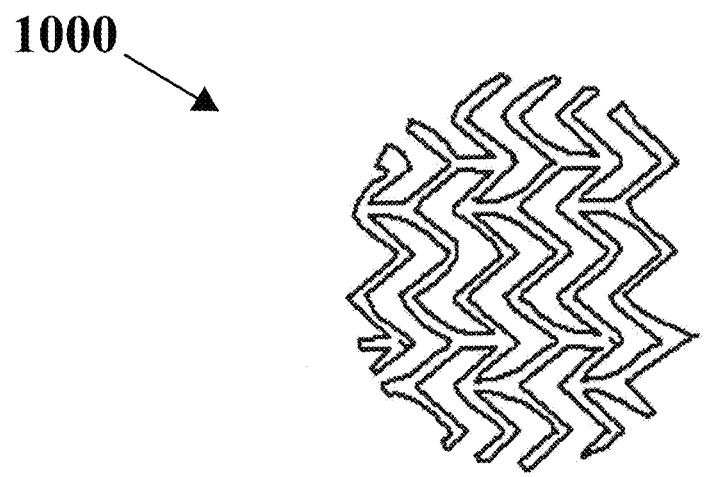
FIG. 10 is a schematic diagram of a small sample of a pattern that can be repeated to produce larger fields.

FIG. 10 is an example of a portion 1000 of a flexible zone of an orthodontic appliance, such as but not limited to the orthodontic appliances illustrated in FIGS. 1-6, that includes a flexible 3D pattern. The pattern can be repeated or combined with other patterns to produce a larger flexible zone.

Figure 11:
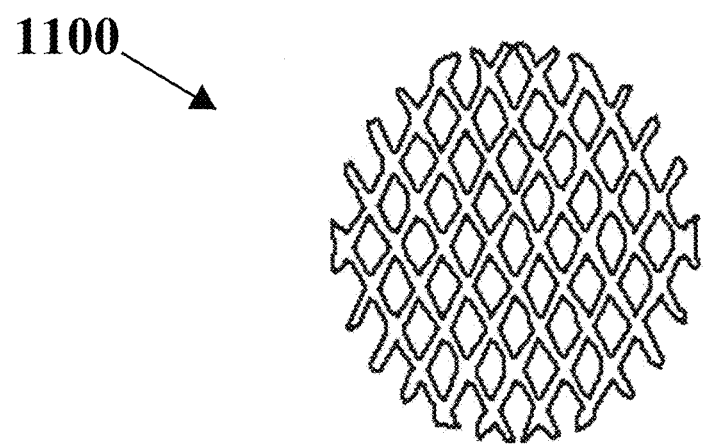
FIG. 11 is a schematic diagram of another small sample of pattern that can be repeated to produce larger fields.

FIG. 11 is an example of a portion 1100 of a flexible zone of an orthodontic appliance, such as but not limited to the orthodontic appliances illustrated in FIGS. 1-6, that includes a flexible 3D pattern. The pattern can be repeated or combined with other patterns to produce a larger flexible zone.

Figure 12:
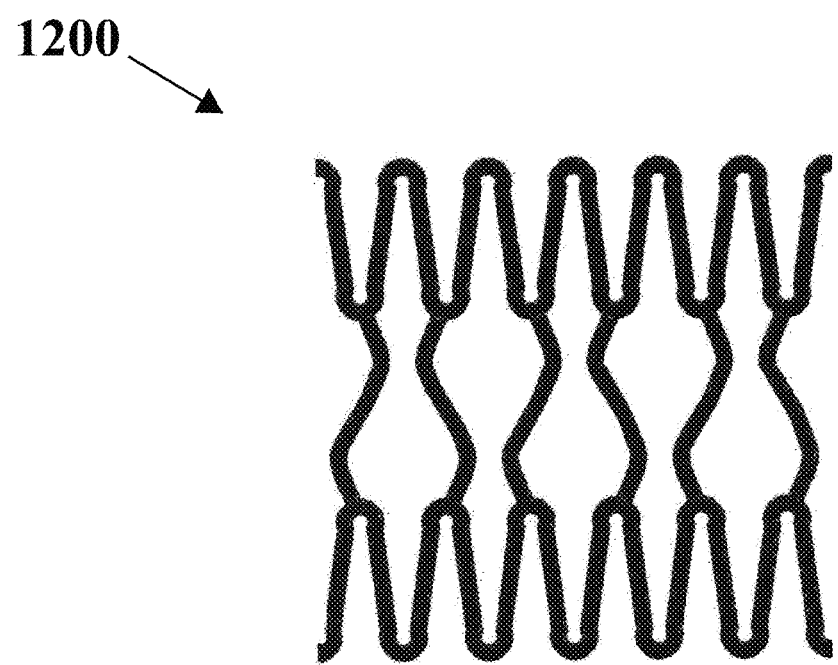
FIG. 12 is a schematic diagram of yet another example of a flexible pattern having irregular S-shaped elements alternately joining with zigzag elements in a regular repeating pattern.

FIG. 12 is an example of a portion 1200 of a flexible zone of an orthodontic appliance, such as but not limited to the orthodontic appliances illustrated in FIGS. 1-6, that includes a flexible 3D pattern. The pattern has irregular S-shaped elements alternately joining with zigzag elements in a regular repeating pattern.

Figure 13:
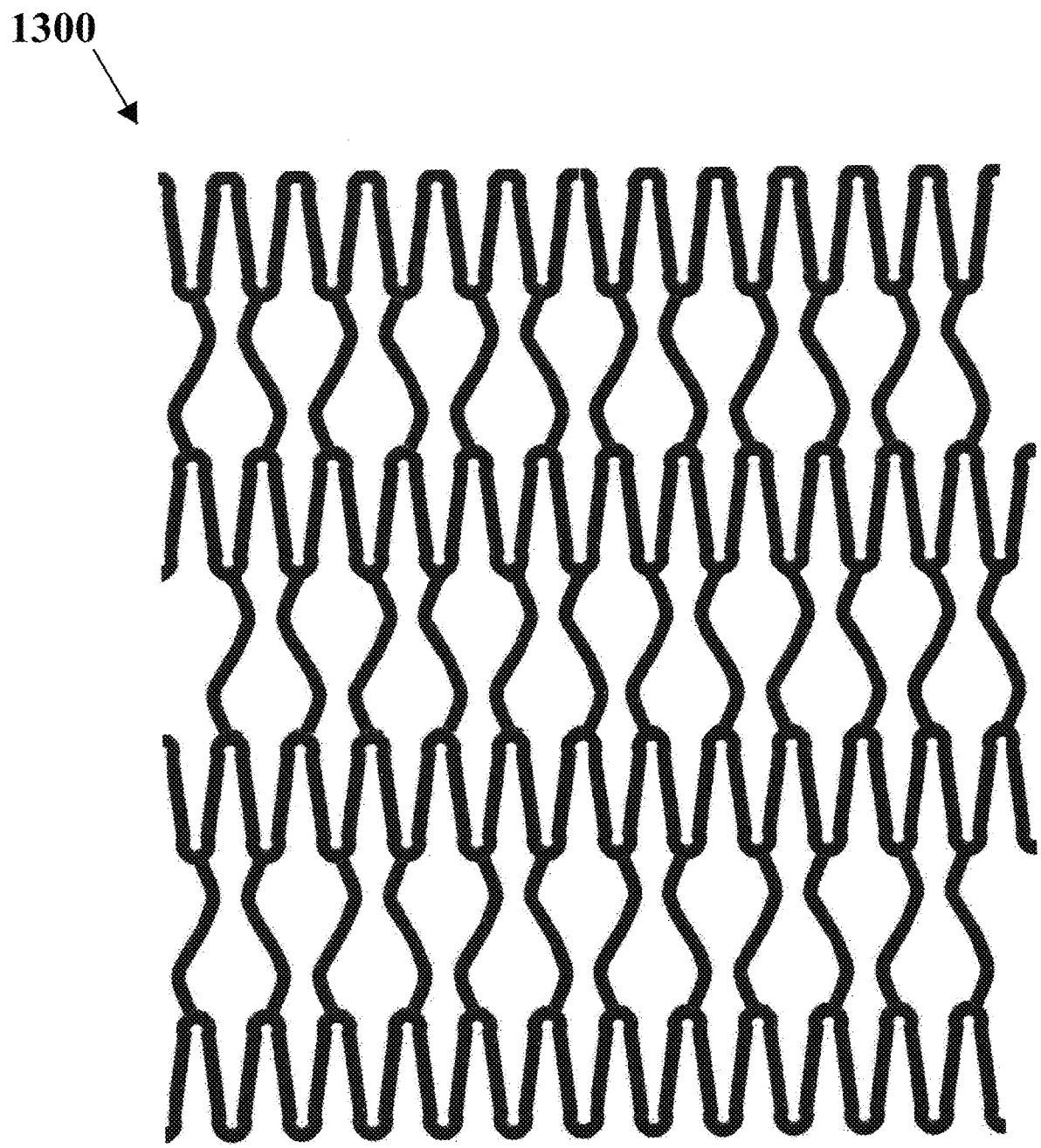
FIG. 13 is a schematic diagram of pattern formed by repeating the pattern in FIG. 12 to produce a larger field.

FIG. 13 is an example of a portion 1300 of a flexible zone of an orthodontic appliance, such as but not limited to the orthodontic appliances illustrated in FIGS. 1-6, that includes a flexible 3D pattern. The portion 1300 is formed by repeating the pattern of the portion 1200 shown in FIG. 12 to produce a larger flexible zone.

Figure 14:
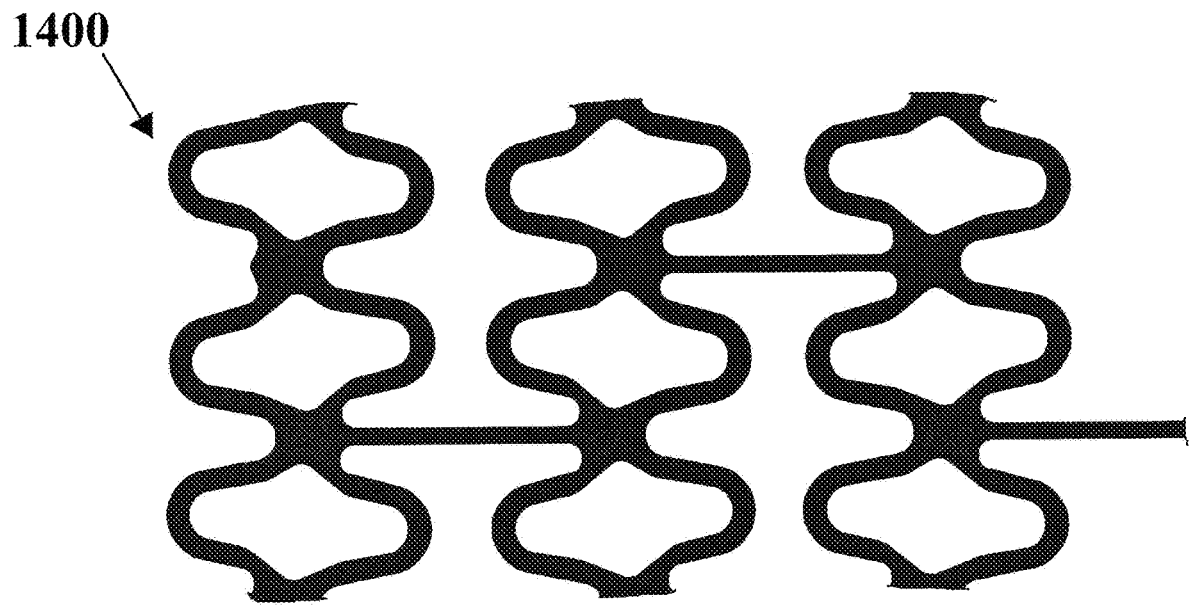
FIG. 14 is a schematic diagram of another example of a flexible pattern that can be repeated to produce a larger field.

FIG. 14 is an example of a portion 1400 of a flexible zone of an orthodontic appliance, such as but not limited to the orthodontic appliances illustrated in FIGS. 1-6, that includes a flexible 3D pattern. The pattern can be repeated or combined with other patterns to produce a larger flexible zone.

Figure 15:
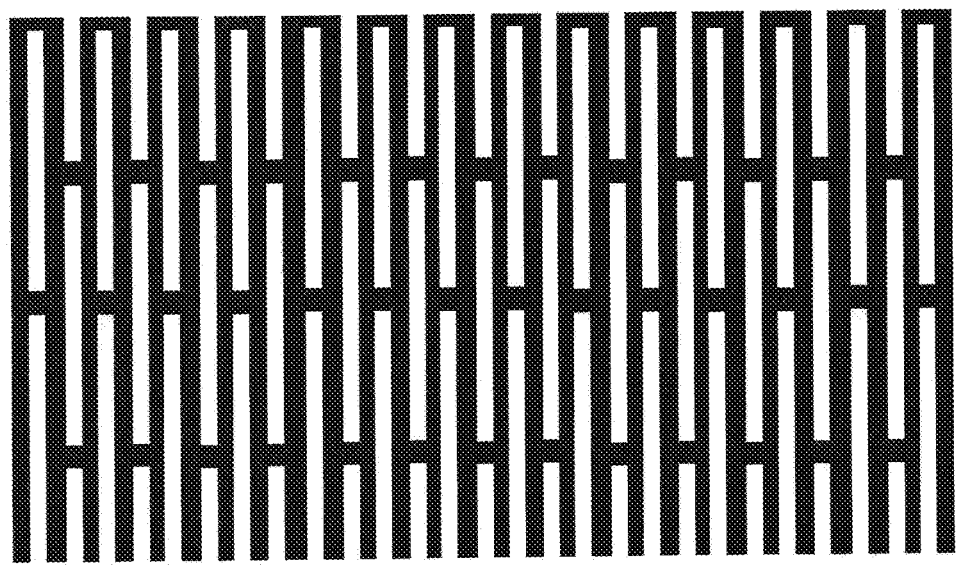
FIG. 15 is a schematic diagram of another example of a flexible pattern that can be repeated to produce a larger field.

FIG. 15 is an example of a portion 1500 of a flexible zone of an orthodontic appliance, such as but not limited to the orthodontic appliances illustrated in FIGS. 1-6, that includes a flexible 3D pattern. The pattern can be repeated or combined with other patterns to produce a larger flexible zone.

FIGS. 16-19 are examples of topographic features arranged in a repeating pattern. The topographic features that are arranged in a repeating pattern include a central structure having three or more legs that extend out radially from a central point and connect to another topographic feature via a connecting structure. The connecting structure includes a curved line that joins a leg from a first topographic feature with a leg from a second topographic feature. The curved line may include multiple parallel segments.

Figure 16:
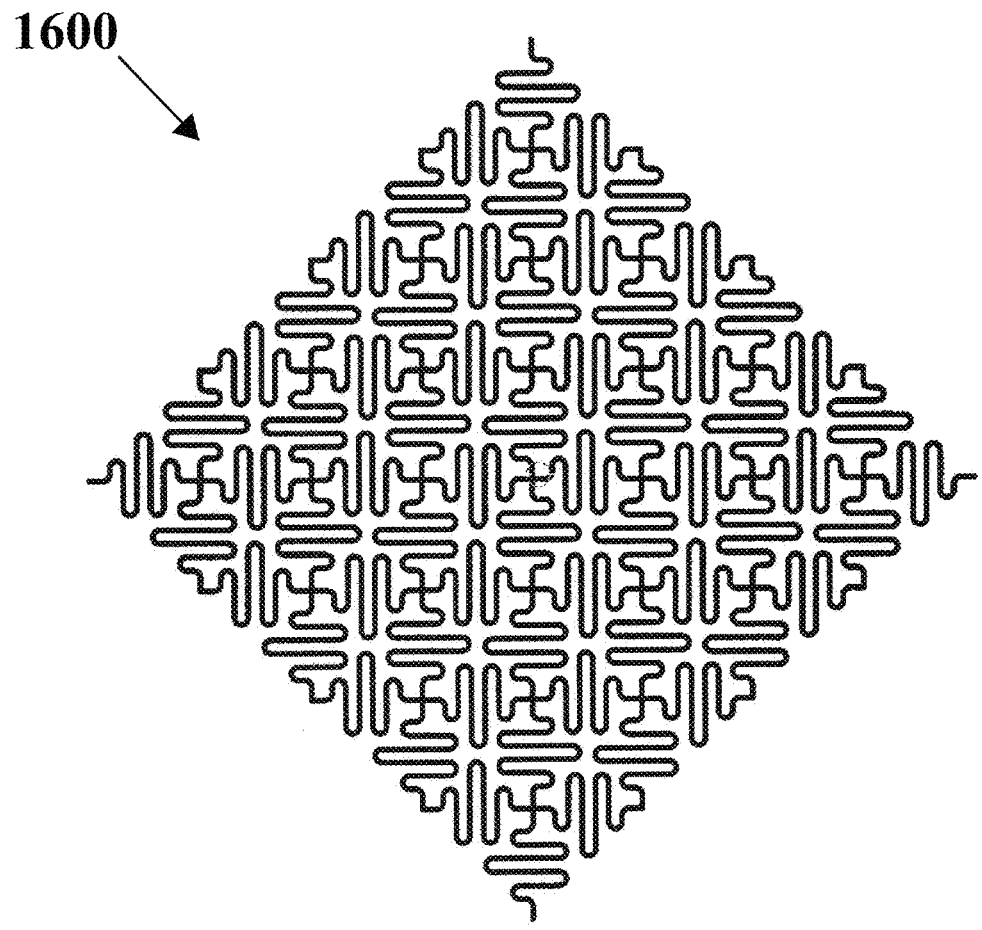
FIG. 16 is a schematic diagram of another example of a flexible pattern.

FIG. 16 is an example of a portion 1600 of a flexible zone of an orthodontic appliance, such as but not limited to the orthodontic appliances illustrated in FIGS. 1-6, that includes a flexible 3D pattern. The pattern includes a four-legged central structure and can be repeated or combined with other patterns to produce a larger flexible zone.

Figure 17:
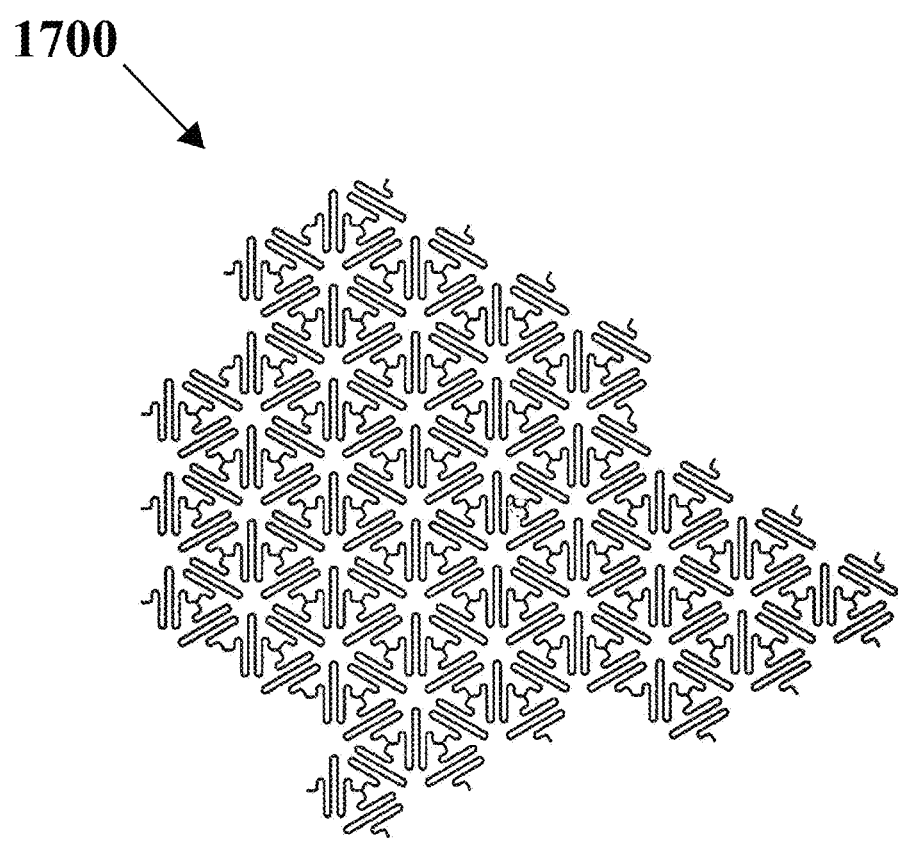
FIG. 17 is a schematic diagram of another example of a flexible pattern.

FIG. 17 is an example of a portion 1700 of a flexible zone of an orthodontic appliance, such as but not limited to the orthodontic appliances illustrated in FIGS. 1-6, that includes a flexible 3D pattern. The pattern includes a three-legged central structure and can be repeated or combined with other patterns to produce a larger flexible zone.

Figure 18:
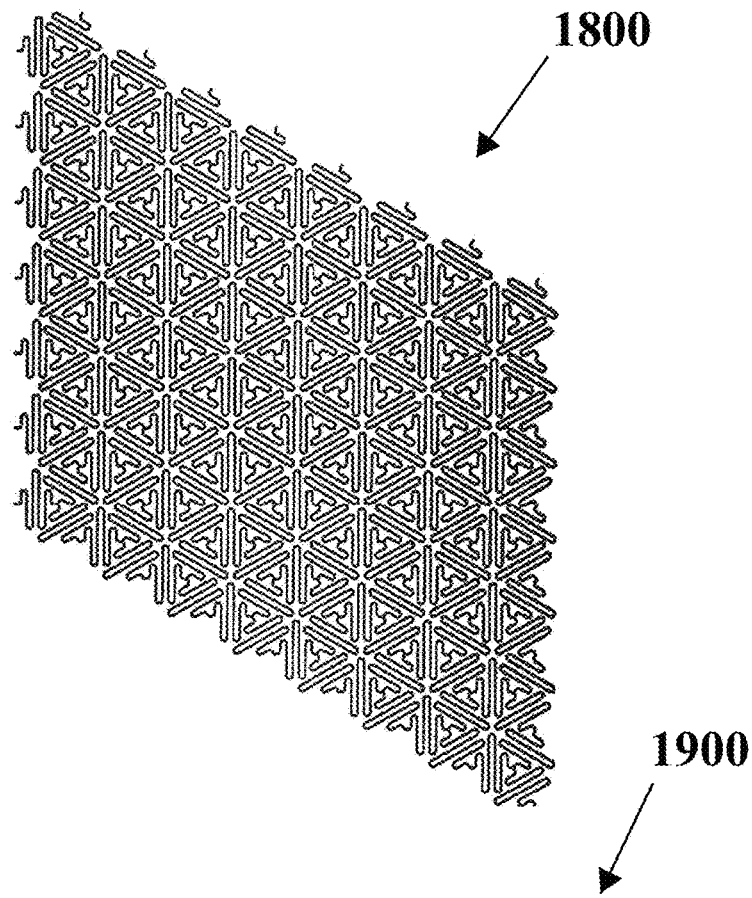
FIG. 18 is a schematic diagram of another example of a flexible pattern.

FIG. 18 is an example of a portion 1800 of a flexible zone of an orthodontic appliance, such as but not limited to the orthodontic appliances illustrated in FIGS. 1-6, that includes a flexible 3D pattern. The pattern includes a three-legged central structure and can be repeated or combined with other patterns to produce a larger flexible zone. The pattern of portion 1800 differs from the pattern of portion 1700 shown in FIG. 17 primarily in the amount of open space between internal elements.

Figure 19:
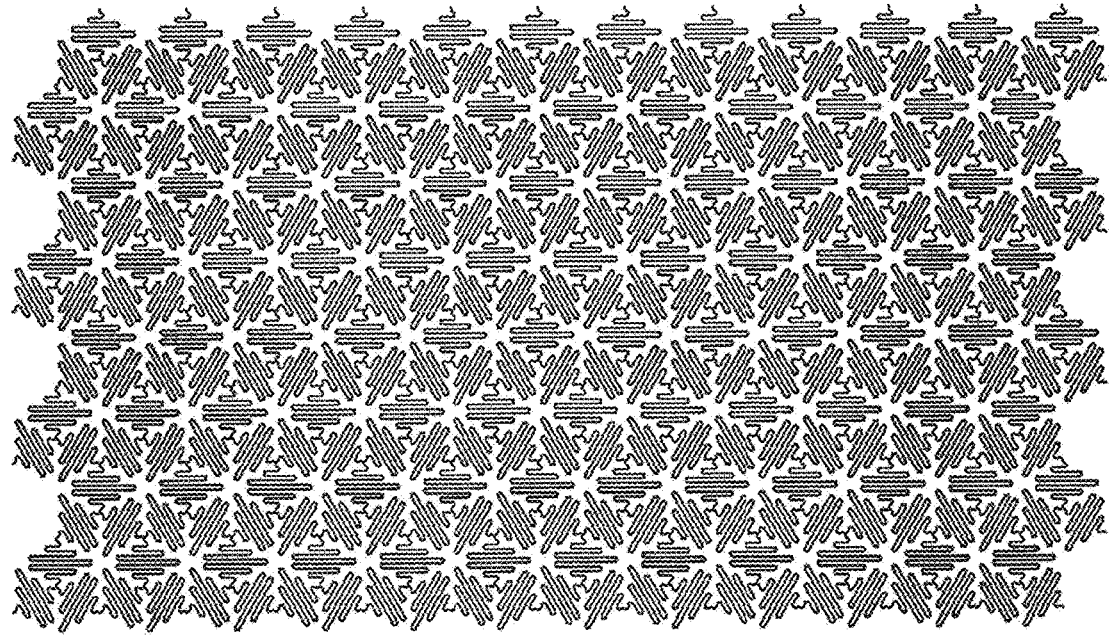
FIG. 19 is a schematic diagram of another example of a flexible pattern.

FIG. 19 is an example of a portion 1900 of a flexible zone of an orthodontic appliance, such as but not limited to the orthodontic appliances illustrated in FIGS. 1-6, that includes a flexible 3D pattern. The pattern includes a three-legged central structure and can be repeated or combined with other patterns to produce a larger flexible zone. The pattern of portion 1900 differs from the patterns of portion 1700 shown in FIG. 17 and portion 1800 shown in FIG. 18 primarily in the amount of open space between internal elements.

The patterns shown on the portions 1600, 1700, 1800, and 1900 that are shown in FIGS. 16-19 are based on patterns for "meso-structured materials" that are distributed by Andrew Bastian at www.thingiverse.com/make:88085. Meso-structured materials are repeating flexible 3D patterns that can be fabricated using rapid prototyping technologies. In other embodiments, the flexible zone can include patterns from other meso-structured materials.

Figure 20:
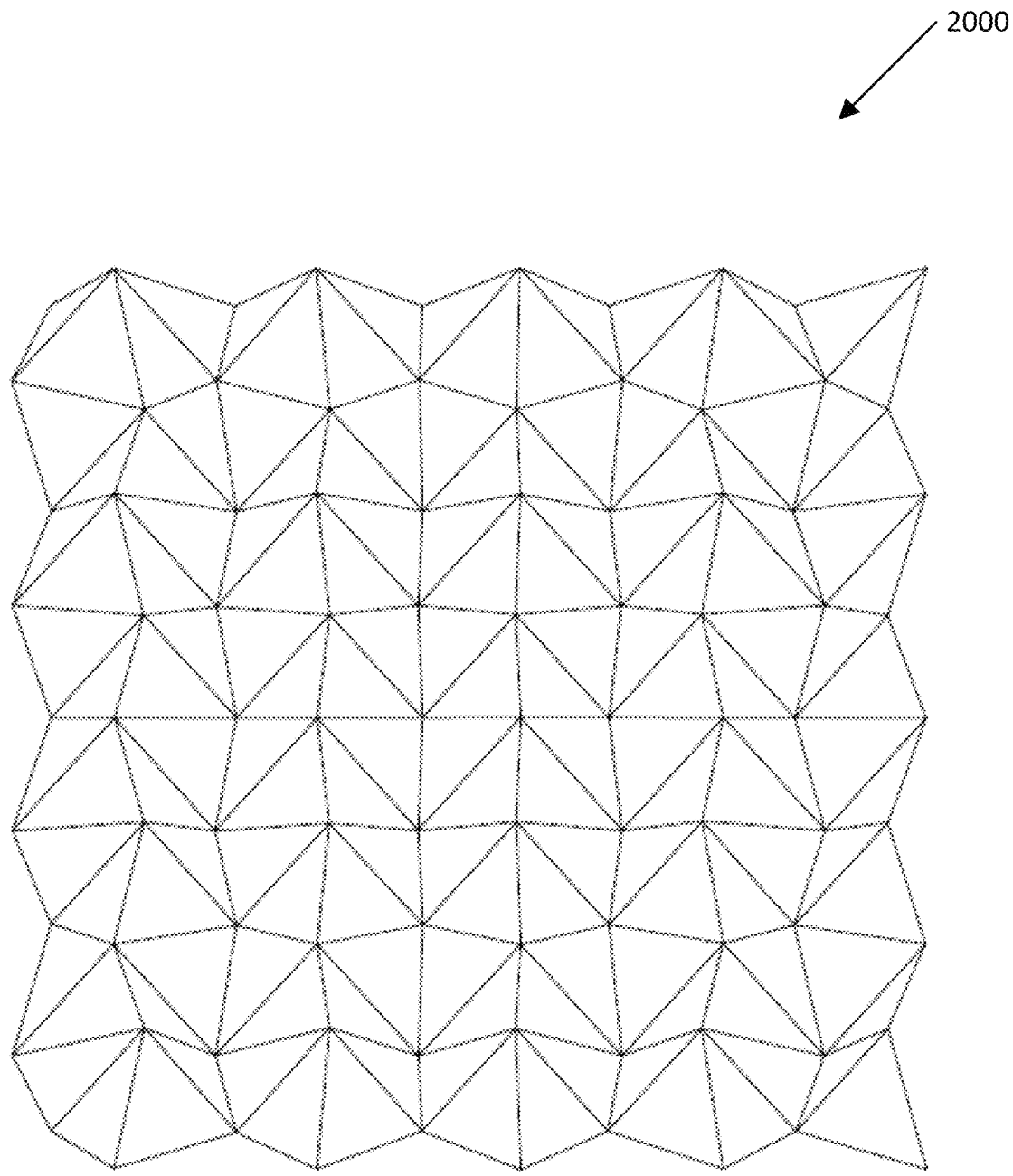
FIG. 20 is a schematic diagram of another example of a flexible pattern.

FIG. 20 is an example of a portion 2000 of a flexible zone of an orthodontic appliance, such as but not limited to the orthodontic appliances illustrated in FIGS. 1-6, that includes a flexible 3D pattern. Unlike the portions illustrated in FIGS. 7-19, the portion 2000 does not include voids. Instead, the portion 2000 includes a plurality of triangular planes with various orientations that form fold lines along which the portion 2000 can flex.

Figure 21:
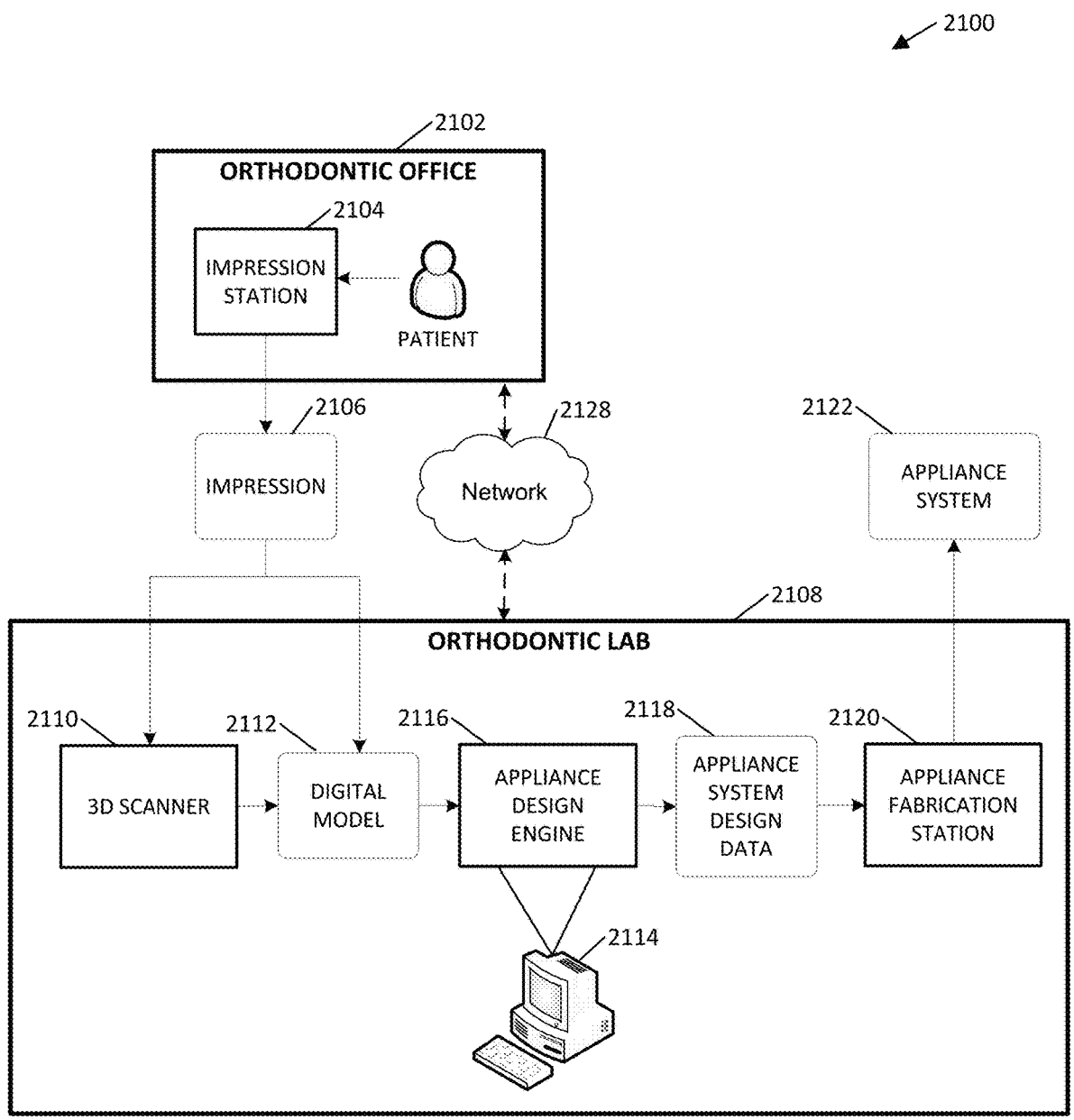
FIG. 21 is a schematic block diagram of an environment and process for producing tooth-positioning aligners.

FIG. 21 is a schematic block diagram illustrating an example of a system 2100 for producing a tooth-positioning appliance system 2122. The tooth-positioning appliance system 2122 includes of one or more tooth-positioning appliances with flexible zones. In this example, the system 2100 includes components at an orthodontic office 2102 and an orthodontic lab 2108.

The orthodontic office 2102 is an office where patients receive orthodontic treatment. The example orthodontic office 2102 includes an impression station 2104. Although FIG. 21 includes an orthodontic office, the system may be used with components from other types of offices such as dental offices or that are located elsewhere.

The example impression station 2104 generates an impression 2106 of the dentition of a patient. The impression 2106 is a geometric representation of the dentition of the patient. Although alternatives are possible, the dental impression 106 is a physical impression captured using an impression material, such as sodium alginate, or vinyl polysiloxane. In other embodiments, other impression materials are used as well.

Alternatively, the dental impression 106 is a digital impression. The digital impression is represented by one or more of a point cloud, a polygonal mesh, a parametric model, or voxel data. Although alternatives are possible, the digital impression can be generated directly from the dentition of the patient P, using for example an intraoral scanner. Example intraoral scanners include the TRIOS Intra Oral Digital Scanner, the Lava Chairside Oral Scanner C.O.S., the Cadent iTero, the Cerec AC, the Cyrtina IntraOral Scanner, and the Lythos Digital Impression System from Ormco. Alternatively, a digital impression is captured using other imaging technologies, such as computed tomography (CT) or magnetic resonance imaging (MRI). In yet other embodiments, the digital impression is generated from a physical impression by scanning the impression or plaster model of the dentition of the patient created from the physical impression. Examples of technologies for scanning a physical impression or model include three dimensional laser scanners and computed tomography (CT) scanners. In yet other embodiments, digital impressions are created using other technologies.

Additionally, in some embodiments, the orthodontic office 2102 sends an orthodontic setup model (not shown)

that includes the patient's teeth in the desired target positions after orthodontic treatment. The orthodontic setup model is typically prepared by an orthodontist. The orthodontic setup model can be a digital model or a physical model.

The orthodontic lab 2108 is a laboratory where orthodontic appliances are fabricated. The example orthodontic lab 2108 includes a 3D scanner 2110, an appliance design system 2114, and an appliance fabrication station 2120. Although shown as a single orthodontic lab in this figure, in some embodiments, the orthodontic lab 2108 comprises multiple orthodontic labs. For example, in some embodiments, the 3D scanner 2110 is in a different orthodontic lab than one or more of the other components shown in the orthodontic lab 2108. Further, in some embodiments, one or more of the components shown in the orthodontic lab 2108 are not in an orthodontic lab. For example, in some embodiments, one or more of the 3D scanner 2110, appliance design system 2114, and appliance fabrication station 2120 are in the orthodontic office 2102. Additionally, some embodiments of the system 2100 do not include all of the components shown in the orthodontic lab 2108.

The example 3D scanner 2110 is a device configured to create a three-dimensional digital representation of the impression 2106 (when the impression 2106 includes a physical impression). In some embodiments, the 3D scanner 2110 generates a point cloud, a polygonal mesh, a parametric model, or voxel data representing the impression 2106. In some embodiments, the 3D scanner 2110 generates the digital model 2112. In some embodiments, the 3D scanner 2110 comprises a laser scanner, a touch probe, or an industrial CT scanner. Yet other embodiments of the 3D scanner 2110 are possible as well. Further, some embodiments of the system 2100 do not include the 3D scanner 2110. For example, in some embodiments of the system 2100 where the impression station 2104 generates a digital dental impression the 3D scanner 2110 is not included. In these embodiments, the digital dental impression may be used directly as or converted to the digital model 2112.

The appliance design system 2114 is system that generates appliance system design data 2118 based on the digital model 2112 and target tooth positions for the patient. The target tooth positions may be received digitally or physically from the orthodontic office. The target tooth positions may also be at least partly derived from the digital model 2112 (e.g., by aligning the teeth in the digital model 2112). Additionally, some embodiments operate without reference to target positions.

The appliance design engine 2116 can then define one or more movement stages. Although alternatives are possible, the movement stages are generally determined based on movement between the tooth positions in the digital model 2112 and the target tooth positions. As an alternative, the movement stages may be defined through simulation of orthodontic treatment or other methods without necessarily referring to target positions. Then the appliance design engine 2116 can generate appliance system design data 2118 that includes three-dimensional shape data that represents an orthodontic appliance for each of the movement stages that is in a format suitable for fabrication using the appliance fabrication station 2120.

Alternatively, the appliance system design data 2118 includes three-dimensional shape data that represents tooth models for each of the movement stages in a format suitable for fabrication using the appliance fabrication station 2120. The tooth models are then fabricated from the appliance system design data 2118 and the appliances are fabricated from the tooth models (e.g., by being thermoformed over tooth models to produce the desired tooth alignment appliances). The tooth models in the appliance system design data 2118 may include various features to form or mark the flexible zones in the appliance. For example, if the appliance includes a pattern of voids, the tooth models may include markings (e.g., ridges or indents) that can be used to guide a cutting process (e.g., using a drill, knife, ultrasonic knife, milling or CNC machine, or any other cutting technology) to cut voids in the thermoformed appliances. For appliance designs with non-void flexible zones (e.g., incorporating a folding pattern such as the portion illustrated and described with respect to at least FIG. 20), the tooth model may include a mold region for forming the shapes of the flexible zone.

In some embodiments, the appliance design system 2114 comprises a computing device including user input devices. The appliance design system 2114 includes an appliance design engine 2116. Although alternatives are possible, the appliance design engine 2116 typically includes computer-aided-design (CAD) software that generates a graphical display of one or both of the digital model 2112 and the appliance system design data 2118 and allows an operator to interact with and manipulate one or both of the digital model 2112 and the appliance system design data 2118.

The appliance design engine 2116 also includes at least some digital tools that mimic the tools used by a laboratory technician to physically design an orthodontic appliance. The appliance design engine 2116 can also include tools to identify or modify flexible zones of an orthodontic appliance that will be fabricated with a flexible pattern (e.g., one of the patterns described above with respect to FIGS. 7-20). The tools may allow the technician to select a pattern to use and to specify parameters for the selected pattern. In some embodiments, the appliance design engine 2116 also evaluates the design of the orthodontic appliance to evaluate the stresses that are likely to be imposed upon the appliance by the patient's teeth. Based on this analysis the appliance design engine 2116 may reject, approve, or modify certain appliance designs. For example, the evaluation process may use finite element analysis to evaluate the orthodontic appliance.

In some other embodiments, the appliance design engine 2116 automates the generation of the model for the appliance system. For example, the appliance design engine may generate a plurality of possible appliance designs that have flexible zones in different locations and having different parameters. The appliance design engine 2116 can then evaluate the possible appliance designs using, for example, finite element analysis. The results of the evaluation can be used to approve, reject, modify, or select for fabrication the possible appliance designs.

Once the appliance system design data 2118 is designed using the appliance design engine 2116, the appliance system design data 2118 is sent to the appliance fabrication station 2120 where the tooth-positioning appliance system 2122 is produced. Typically, the appliance system 2122 comprises one or more tooth-positioning appliances that are configured to be used to position the teeth of the patient.

Although alternatives are possible, the appliance fabrication station 2120 typically includes one or more rapid fabrication machines. Examples of the rapid fabrication machines include three-dimensional printers, such as the ProJet line of printers from 3D Systems, Inc. of Rock Hill, S.C. Another example of a rapid fabrication machine is stereolithography equipment. Still another example of a rapid fabrication machine is a digital light processing (DLP) rapid prototyping system, such as the Perfactory system from EnvisionTEC, Inc. of Dearborn, Mich. Yet another example of a rapid fabrication machine is a milling device, such as a computer numerically controlled (CNC) milling device. In some embodiments, the appliance fabrication station 2120 is configured to receive files in the STL format.

The appliance fabrication station 2120 can also include thermoforming equipment that is used to thermoform appliances over tooth models fabricated from the appliance system design data 2118 using a rapid fabrication machine The appliance fabrication station 2120 may also include cutting equipment for cutting voids thermoformed appliances to form the flexible zones. Other embodiments of the appliance fabrication station 2120 are possible as well.

In an alternative embodiment, the appliance fabrication station 2120 includes milling equipment for milling a biocompatible plastic material that can be placed in the patient's mouth. In these embodiments, the tooth-positioning appliances of the tooth-positioning appliance system 2122 are milled from a biocompatible plastic material.

The orthodontic office 2102 may be connected to the orthodontic lab 2108 by a network 2128. The impression 2106 may be transmitted from the orthodontic office 2102 to the orthodontic lab 2108 via the network 2128. Additionally, a setup model that includes the target positions of the patient's teeth may also be transmitted from the orthodontic office 2102 to the orthodontic lab 2108 via the network 2128.

The network 2128 is an electronic communication network that facilitates communication between the orthodontic office 2102 and the orthodontic lab 2108. An electronic communication network is a set of computing devices and links between the computing devices. The computing devices in the network use the links to enable communication among the computing devices in the network. The network 2128 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 138 includes various types of links. For example, the network 2128 can include one or both of wired and wireless links, including Bluetooth, ultra-wideband (UWB), 802.11, ZigBee, and other types of wireless links. Furthermore, in various embodiments, the network 2128 is implemented at various scales. For example, the network 2128 can be implemented as one or more local area networks (LANs), metropolitan area networks, subnets, wide area networks (such as the Internet), or can be implemented at another scale.

Figure 22:
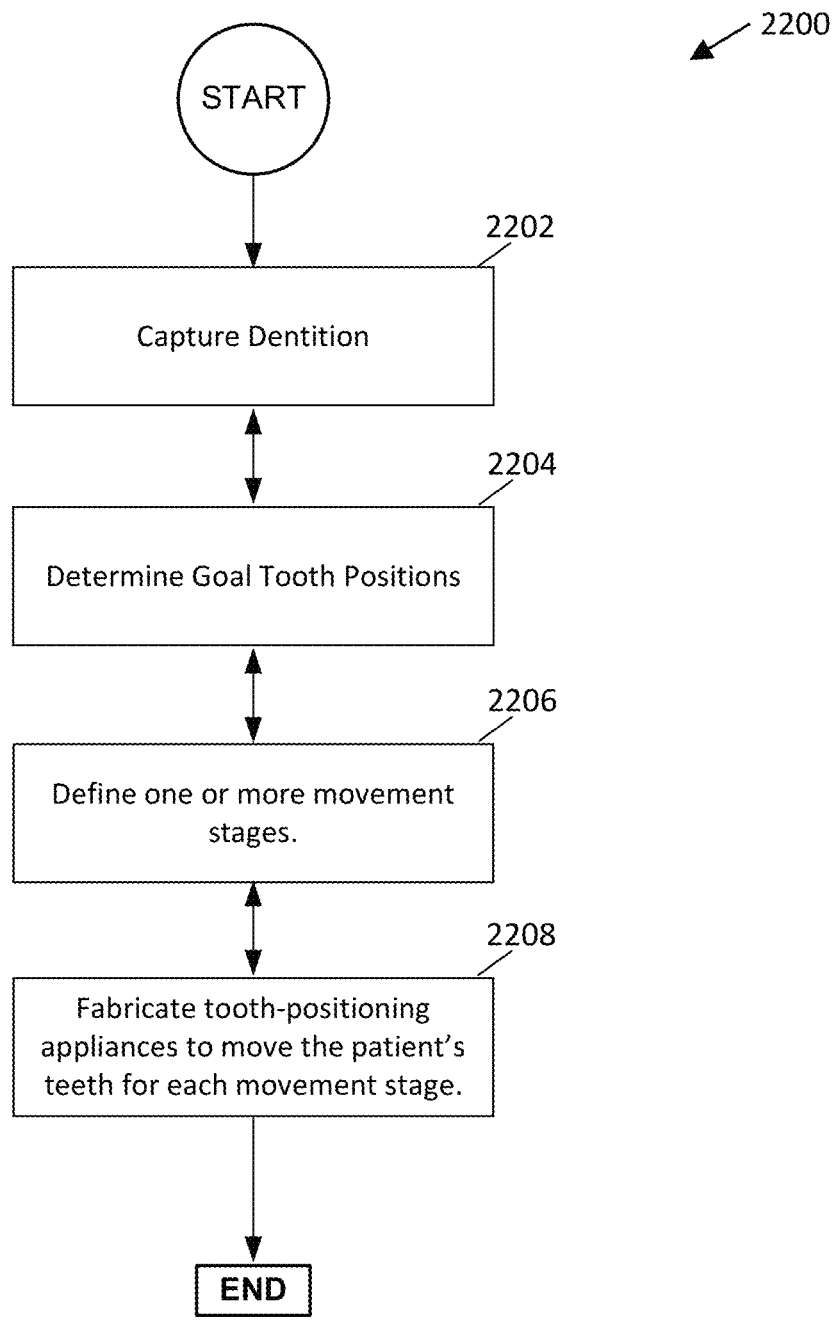
FIG. 22 is an example method performed by some embodiments of the system of FIG. 21.

FIG. 22 is a flow chart illustrating an example method 2200 of producing a tooth-positioning appliance system. In some embodiments, the method 2200 is performed by embodiments of the system 2100. In this example, the method 2200 includes operations 2202, 2204, 2206, and 2208.

At operation 2202, the patient's dentition is captured. As described previously, the patient's dentition can be captured using physical or digital impression data.

At operation 2204, the goal tooth positions are determined. As described previously, the goal tooth positions may be received in the form a physical model defined by an orthodontist. The goal tooth positions may also be determined by aligning the teeth of the patient's existing dentition.

At operation 2206, one or more movement stages are defined between the patient's current dentition and the goal tooth positions for the patient. The movement stages may defined so that movement of any tooth during a particular movement stage is limited to a threshold amount.

At operation 2208, tooth-positioning appliances are fabricated to move the patient's teeth for each movement stage. Typically, the tooth-positioning appliances are fabricated to fit the patient's teeth in the final position of a movement stage, but are designed to be placed on the patient's teeth at the beginning of the movement stage. The tooth-position appliances generally include flexible zones that allow the tooth-positioning appliances to distort to fit the position of the patient's teeth prior to movement during the movement stage. As the tooth-positioning appliance slowly returns to its undistorted form, the tooth-positioning appliance applies steady and gentle force to move the patient's teeth over time. An example process for designing the tooth-positioning appliances is illustrated and described with respect to at least FIG. 23.

Figure 23:
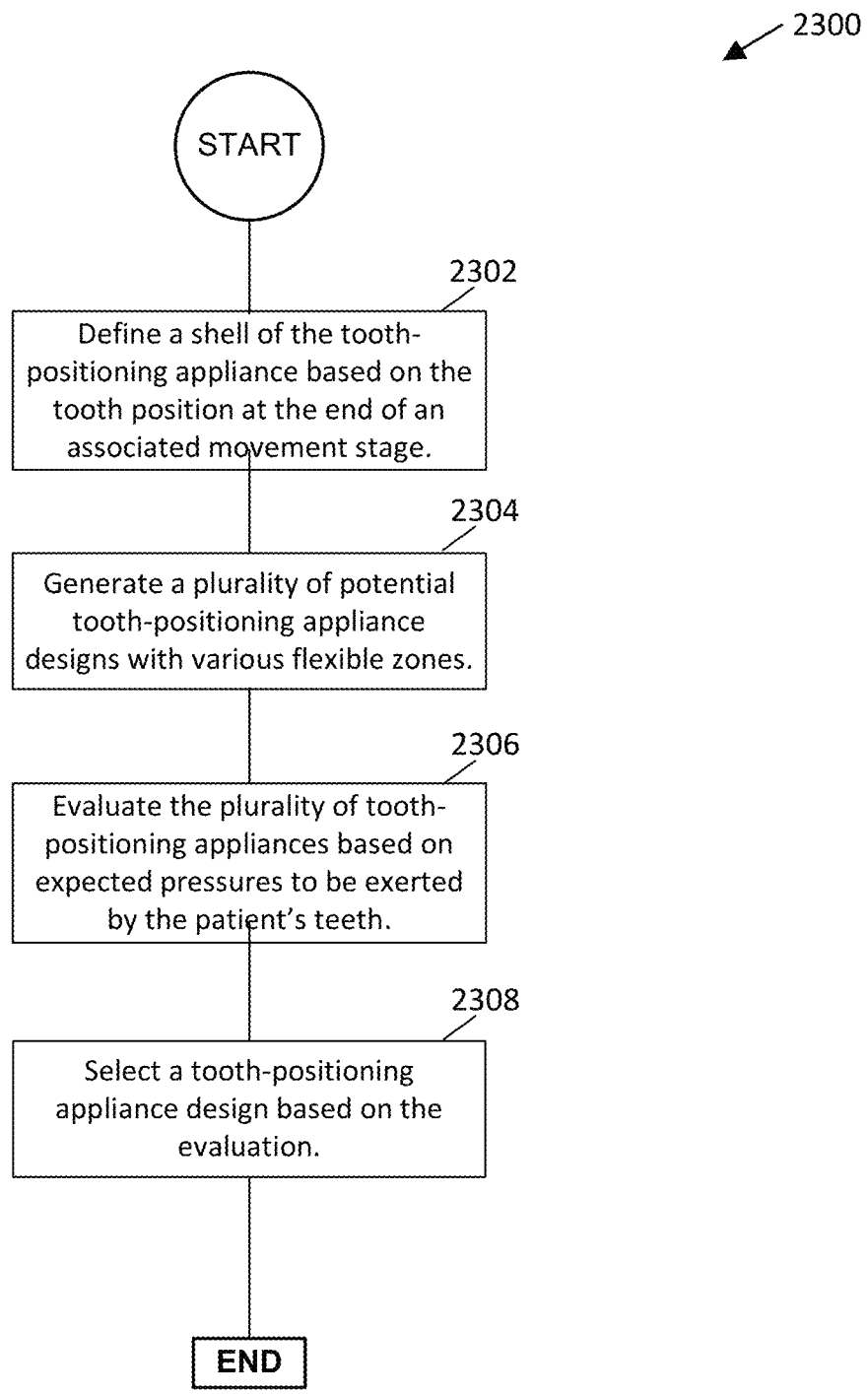
FIG. 23 is another example method performed by some embodiments of the system of FIG. 21.

FIG. 23 is a flow chart illustrating an example method 2300 of designing a tooth-positioning appliance with flexible zones for a movement stage. In some embodiments, the method 2300 is performed by embodiments of the appliance design engine 2116. In this example, the method 2300 includes operations 2302, 2304, 2306, and 2308.

At operation 2302, a shell of the tooth-positioning appliance is defined based on the desired tooth positions at the end of a movement stage. In some aspects, the shell is designed by applying an offset to a portion of a dental model of the teeth after the movement stage. In some embodiments, a first offset (e.g., 0.1-0.5 mm) is applied to create the interior surface of the tooth-positioning appliance and a second offset (e.g., 1-2 mm) is applied to create the exterior surface of the tooth-positioning appliance. The interior surface and the exterior surface can then be joined to form the shell of the tooth-positioning appliance.

At operation 2304, a plurality of potential tooth-positioning appliance designs with various flexible zones are generated from the shell. For example, potential tooth-positioning appliances could be generated with flexible zones according to one or more of the examples described in FIGS. 1-6 in combination with one or more of the patterns illustrated in FIGS. 7-20. Of course, the potential tooth-positioning appliances are not limited to the examples of FIGS. 1-6 and the patterns of FIGS. 7-20. The potential tooth-positioning appliances can also be generated by randomly adding voids to the shell (throughout or in particular regions such as near interproximal areas), randomly removing voids in some of the previously described, or a combination thereof. In some embodiments, many (e.g., between dozens and thousands) potential tooth-positioning appliances are generated.

At operation 2306, the plurality of potential tooth-positioning appliances designs are evaluated based on the expected pressure to be exerted by the patient's teeth. As described above, finite element analysis or other techniques may be used to evaluate the stresses on the potential tooth-positioning appliance designs when the tooth-positioning appliance is distorted to fit over the patient's teeth (e.g., in the expected tooth positions at the start of a movement stage). In some embodiments, the plurality of potential tooth-positioning appliance designs are evaluated to determine the amount of pressure that will be applied on the patient's teeth as well (e.g., the teeth in the initial tooth positions for a movement stage or at various points during the movement stage).

At operation 2308, a tooth-positioning appliance is selected based on the evaluation. For example, a tooth-positioning appliance may be selected that minimizes the stress on the tooth-positioning appliance (e.g., either throughout the appliance or in particular regions such as the tooth-clasping regions). Alternatively, the tooth-positioning appliance may be selected to provide an even force on the patient's teeth throughout the movement stage. In some embodiments, various thresholds are used to eliminate some of the tooth-positioning appliances are used (e.g., designs that result in pressures that exceed the likely breaking point of the appliance material are eliminated, designs that apply so little pressure to the patient's that the patient's teeth are unlikely to move, etc.).

Although alternatives are possible, some embodiments of the appliance design engine 216 include a generative design system. Examples of generative design system include AutoDesk Within generative design software from Autodesk, Inc. of San Rafeal, Calif. and Element design software from nTopology Inc., of New York, N.Y.

In some aspects, the tooth-positioning appliances are designed by the appliance design engine 2116 using a generative design process. In some aspects, the shell of the tooth positioning appliance is designed as described in 2302. Then the shell is analyzed by the generative design system to determine where to remove material and where to generate flexible regions. The generative design system may use finite element analysis to analyze the shell and identify regions under pressure and subject to stress. To perform the analysis the generative design system may receive various parameters such as the tooth positions or desired positions. The parameters may also identify the teeth that should be moved by the appliance. The generative design process will then identify regions that need flexibility based on for example, identifying regions that need elongation. The generative design process will also then identify areas where material can be removed to create voids by, for example, identifying regions that are not under stress and that are not in forceful contact with the teeth. The flexible regions may then be formed using the patterns above or may be formed without a pattern by the generative design system.

Figure 24:
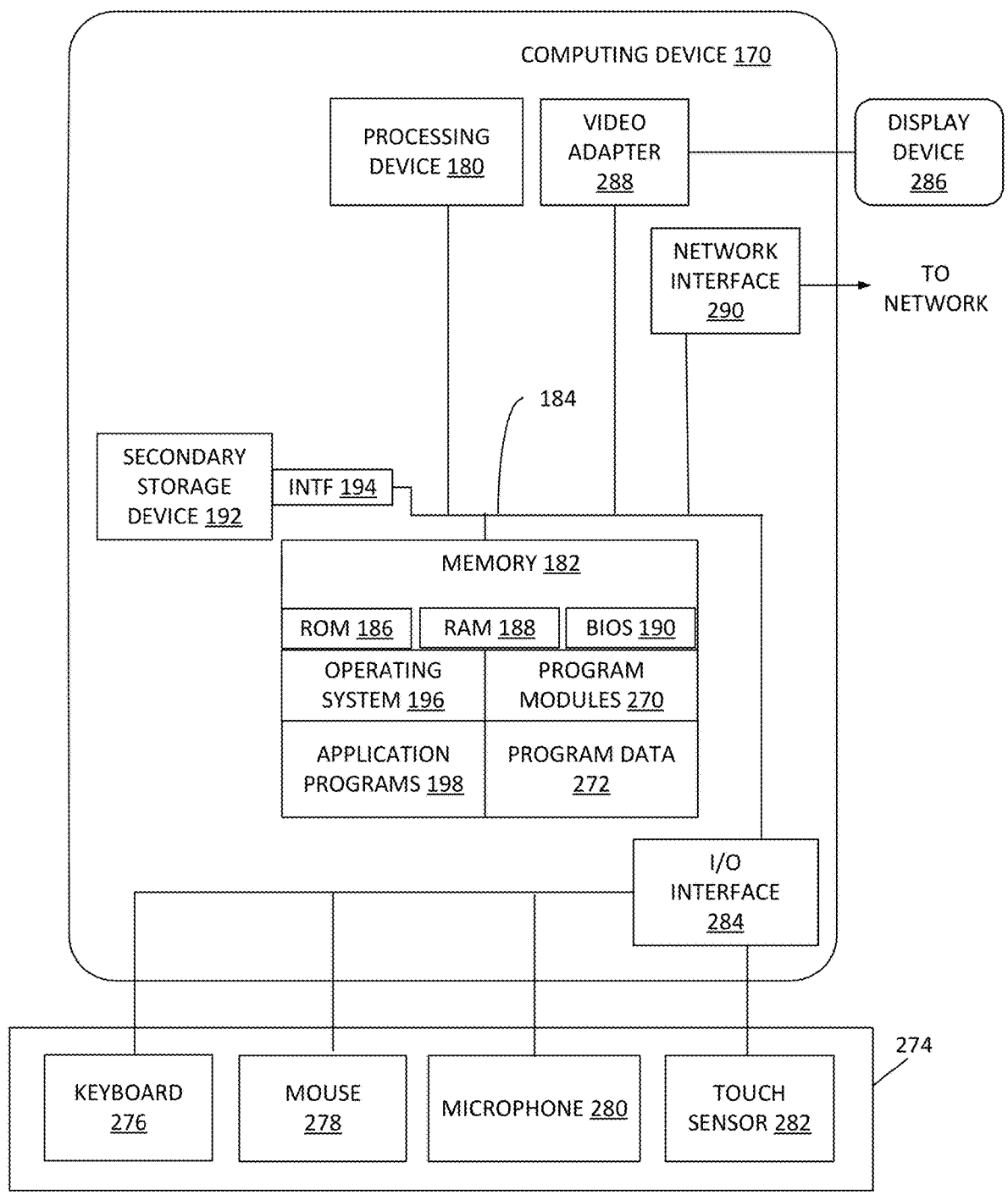
FIG. 24 is an example architecture of a computing device, which can be used to implement aspects according to the present disclosure.

FIG. 24 illustrates an exemplary architecture of a computing device 170 that can be used to implement aspects of the present disclosure, including any of the plurality of computing devices described herein, such as a computing device of the impression station 2104, appliance design system 2114, appliance fabrication station 2120, or any other computing devices that may be utilized in the various possible embodiments.

The computing device illustrated in FIG. 24 can be used to execute the operating system, application programs, and software modules (including the software engines) described herein.

The computing device 170 includes, in some embodiments, at least one processing device 180, such as a central processing unit (CPU). A variety of processing devices are available from a variety of manufacturers, for example, Intel or Advanced Micro Devices. In this example, the computing device 170 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 170 include a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 170, such as during start up, is typically stored in the read only memory 186.

The computing device 170 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 170.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or system memory 182, including an operating system 196, one or more application programs 198, other program modules 270 (such as the software engines described herein), and program data 272. The computing device 170 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 170 through one or more input devices 274. Examples of input devices 274 include a keyboard 276, mouse 278, microphone 280, and touch sensor 282 (such as a touchpad or touch sensitive display). Other embodiments include other input devices 274. The input devices are often connected to the processing device 180 through an input/output interface 284 that is coupled to the system bus 184. These input devices 274 can be connected by any number of input/output interfaces, such as a parallel port, serial port, game port, or a universal serial bus. Wireless communication between input devices and the interface 284 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 286, such as a monitor, liquid crystal display device, projector, or touch sensitive display device, is also connected to the system bus 184 via an interface, such as a video adapter 288. In addition to the display device 286, the computing device 170 can include various other peripheral devices (not shown), such as speakers or a printer.

When used in a local area networking environment or a wide area networking environment (such as the Internet), the computing device 170 is typically connected to the network through a network interface 290, such as an Ethernet interface. Other possible embodiments use other communication devices. For example, some embodiments of the computing device 170 include a modem for communicating across the network.

The computing device 170 typically includes at least some form of computer readable media. Computer readable media includes any available media that can be accessed by the computing device 170. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 170.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 24 is also an example of programmable electronics, which may include one or more such computing devices, and when multiple computing devices are included, such computing devices can be coupled together with a suitable data communication network so as to collectively perform the various functions, methods, or operations disclosed herein.

The above disclosure sets forth a number of embodiments that are described in detail with respect to the accompanying drawings. Those skilled in this art will appreciate that various changes, modifications, other structural arrangements, and other embodiments could be practiced under the teachings of the present disclosure without departing from the scope of this disclosure.

What is claimed is:

1. An orthodontic appliance for adjusting the position of teeth of a patient, comprising:
   a tooth-clasping arrangement shaped to secure the orthodontic appliance to at least one tooth; and
   a flexible arrangement connected to the tooth-clasping arrangement, wherein the flexible arrangement is formed integrally with the tooth-clasping arrangement from a shell of the orthodontic appliance and a topography of the flexible arrangement is different than a topography of the tooth-clasping arrangement and the flexible arrangement is more flexible than the tooth-clasping arrangement, the topography of the flexible arrangement including topographic features that are arranged in a repeating pattern,
   wherein the topographic features include a central structure having three or more legs that extend out radially from a central point and connect to another topographic feature via a connecting structure, the connecting structure including a curved line that joins a leg from a first topographic feature with a leg from a second topographic feature.

2. The orthodontic appliance of claim 1, wherein the tooth-clasping arrangement is configured to secure the orthodontic appliance to multiple teeth.

3. The orthodontic appliance of claim 1, wherein the tooth-clasping arrangement is configured to mate with one or more bonded attachments that are secured to the teeth of the patient.

4. The orthodontic appliance of claim 3, wherein the tooth-clasping arrangement comprises at least one rigid border region formed in the shell of the orthodontic appliance and positioned to surround the one or more bonded attachments when the orthodontic appliance is worn by the patient.

5. The orthodontic appliance of claim 1, wherein the flexible arrangement further includes a plurality of voids disposed in the shell of the appliance.

6. An orthodontic appliance system for adjusting the position of teeth of a patient, comprising:
   a first orthodontic appliance comprising:
      a first tooth-clasping arrangement shaped to secure the first orthodontic appliance to at least one tooth; and
      a first flexible arrangement connected to the first tooth-clasping arrangement, wherein the first flexible arrangement is more flexible than the first tooth-clasping arrangement, the first flexible arrangement including topographic features repeated in connected rows, the topographic features including a central structure having three or more legs that extend out radially from a central point and connect to another topographic feature via a connecting structure, the connecting structure including a curved line that includes multiple parallel segments, the curved line joining a leg from a first topographic feature with a leg from a second topographic feature, the first flexible arrangement formed integrally with the first tooth-clasping arrangement in a shell of the orthodontic appliance.

7. The orthodontic appliance system of claim 6, further comprising:
   a second orthodontic appliance comprising:
      a second tooth-clasping arrangement shaped to secure the second orthodontic appliance to at least one tooth; and
      a second flexible arrangement connected to the second tooth-clasping arrangement, wherein the second flexible arrangement is more flexible than the second tooth-clasping arrangement.

8. The orthodontic appliance system of claim 7, wherein the first orthodontic appliance is configured to be used to cause a first movement of the teeth of the patient, and the second orthodontic appliance is configured to be used to cause a second movement of the teeth of the patient.

9. The orthodontic appliance of claim 6, wherein the first flexible arrangement is configured to allow elongation of the first orthodontic appliance.

10. An orthodontic appliance for adjusting positions of teeth of a patient, comprising:
    a structure formed from at least one plastic material and configured to fit over at least two of the patient's teeth, the structure including:

topographic features that allow for increased elongational flexure of the structure, the topographic features including a central structure having three or more legs that extend out radially from a central point and connect to another topographic feature via a connecting structure, the connecting structure including a curved line, the curved line including multiple parallel segments and joining a leg from a first topographic feature with a leg from a second topographic feature.

11. The orthodontic appliance of claim 10, wherein the topographic features include features disposed at locations on the structure that require elongation based on desired tooth positions.

12. The orthodontic appliance of claim 10, wherein the topographic features include voids disposed in locations that are not in forceful contact with teeth when the appliance is worn by the patient.

13. The orthodontic appliance of claim 10, wherein the topographic features include voids that are disposed within a flexible zone of the structure in regions that are not under stress when the appliance is worn by the patient.

14. The orthodontic appliance of claim 10, wherein the topographic features further include voids.

15. The orthodontic appliance of claim 10, wherein the topographic features are repeated in connected rows.

16. The orthodontic appliance of claim 10, wherein the topographic features that allow for increased elongational flexure of the structure allow the structure to distort when worn on the teeth of the patient and the structure is configured to apply a force on the patient's teeth as the structure returns to an undistorted state.

17. The orthodontic appliance of claim 1, wherein the curved line includes multiple parallel segments.

* * * * *